US010467612B2

(12) United States Patent
Murphy et al.

(10) Patent No.: US 10,467,612 B2
(45) Date of Patent: Nov. 5, 2019

(54) VOLUME BASED TRANSACTION COST RECOVERY

(71) Applicant: Bank of America Corporation, Charlotte, NC (US)

(72) Inventors: Matthew D. Murphy, Charlotte, NC (US); Elbert Lee Whitler, Webster Groves, MO (US)

(73) Assignee: Bank of America Corporation, Charlotte, NC (US)

( * ) Notice: Subject to any disclaimer, the term of this patent is extended or adjusted under 35 U.S.C. 154(b) by 991 days.

(21) Appl. No.: 13/681,293

(22) Filed: Nov. 19, 2012

(65) Prior Publication Data

US 2014/0143135 A1 May 22, 2014

(51) Int. Cl.
*G06Q 40/00* (2012.01)
*G06Q 20/22* (2012.01)
*G06Q 20/20* (2012.01)

(52) U.S. Cl.
CPC ............ *G06Q 20/22* (2013.01); *G06Q 20/20* (2013.01)

(58) Field of Classification Search
CPC ...................................................... G06Q 40/00
USPC ............................................... 705/35, 39, 38
See application file for complete search history.

(56) References Cited

U.S. PATENT DOCUMENTS 3,815,269 A 6/1974 Roselli
6,012,048 A 1/2000 Gustin et al.
6,105,001 A 8/2000 Masi et al.
6,129,272 A 10/2000 Yoshida et al.
6,328,207 B1 12/2001 Gregoire et al.
6,626,356 B2 9/2003 Davenport et al.
6,999,943 B1 2/2006 Johnson et al.
7,255,200 B1 8/2007 Walter
7,308,356 B2 12/2007 Melaku et al.
7,379,920 B2 5/2008 Leung et al.
7,387,250 B2 6/2008 Muni
7,447,657 B1 11/2008 Krajewski et al.
7,668,780 B2 2/2010 Battaglini et al.
7,882,026 B1 2/2011 Zettner
7,949,555 B2 5/2011 Young et al.
(Continued)

OTHER PUBLICATIONS

"Definition of 'Percentage' by the Free Online Dictionary," TheFreeDictionary.com, Jul. 24, 2013.
(Continued)

*Primary Examiner* — Ojo O Oyebisi
(74) *Attorney, Agent, or Firm* — Weiss & Arons LLP; Michael A. Springs, Esq.

(57) ABSTRACT

Apparatus and methods for determining a surcharge yield are provided. A surcharge behavior may be monitored during a time period. A change in a first performance metric may be monitored during the time period. A change in a second performance metric may be monitored during the time period. A relationship between the surcharge behavior, the change in the first performance metric and the change in the second performance metric may be determined. The surcharge yield may be determined based on the relationship. Apparatus and methods for adjusting a transaction cost recovery amount are provided. A rate of change in a transaction volume may be monitored. The transaction volume may be associated with a merchant location. When a threshold rate of change is detected the transaction cost recovery amount may be adjusted.

14 Claims, 11 Drawing Sheets

(56) References Cited

U.S. PATENT DOCUMENTS

| | | | |
|---|---|---|---|
| 8,301,559 | B2 | 10/2012 | McElroy et al. |
| 2002/0049632 | A1 | 4/2002 | Parkinson |
| 2002/0128967 | A1 | 9/2002 | Meyer et al. |
| 2002/0143655 | A1 | 10/2002 | Elston et al. |
| 2003/0074316 | A1 | 4/2003 | McCallum |
| 2003/0126139 | A1 | 7/2003 | Lee et al. |
| 2003/0216969 | A1 | 11/2003 | Bauer et al. |
| 2004/0044627 | A1 | 3/2004 | Russell et al. |
| 2005/0004839 | A1 | 1/2005 | Bakker et al. |
| 2006/0229998 | A1 | 10/2006 | Harrison et al. |
| 2007/0124216 | A1 | 5/2007 | Lucas |
| 2007/0175984 | A1 | 8/2007 | Khandaker et al. |
| 2007/0288372 | A1 | 12/2007 | Behar et al. |
| 2007/0294318 | A1 | 12/2007 | Arora et al. |
| 2008/0208680 | A1 | 8/2008 | Cho |
| 2008/0270275 | A1 | 10/2008 | McElroy et al. |
| 2008/0275774 | A1 | 11/2008 | Pepe et al. |
| 2009/0063291 | A1 | 3/2009 | Robbins et al. |
| 2009/0108080 | A1 | 4/2009 | Meyer et al. |
| 2009/0132312 | A1 | 5/2009 | Reinheimer et al. |
| 2009/0222337 | A1 | 9/2009 | Sergiades |
| 2010/0153266 | A1 | 6/2010 | Plunkett et al. |
| 2010/0169170 | A1 | 7/2010 | Fordyce, III et al. |
| 2010/0250379 | A1 | 9/2010 | Giordano et al. |
| 2010/0280948 | A1 | 11/2010 | Cohen |
| 2011/0054992 | A1 | 3/2011 | Liberty et al. |
| 2011/0078032 | A1 | 3/2011 | Johnson |
| 2011/0125564 | A1 | 5/2011 | DeLillio |
| 2011/0137789 | A1 | 6/2011 | Kortina et al. |
| 2011/0231314 | A1 | 9/2011 | Sears et al. |
| 2011/0302080 | A1 | 12/2011 | White et al. |
| 2011/0307359 | A1 | 12/2011 | Gude et al. |
| 2012/0029982 | A1 | 2/2012 | Andrade |
| 2012/0030045 | A1 | 2/2012 | Smith, III |
| 2012/0047007 | A1 | 2/2012 | Halsey et al. |
| 2012/0078790 | A1 | 3/2012 | Ornce et al. |
| 2012/0158566 | A1 | 6/2012 | Fok et al. |
| 2012/0271707 | A1 | 10/2012 | Harrison et al. |
| 2013/0054465 | A1 | 2/2013 | Sakata et al. |
| 2014/0039999 | A1* | 2/2014 | Levene .............. G06Q 20/0855 705/14.23 |

OTHER PUBLICATIONS

"19 Walmart Stores near '22314,'" Walmart.com, Jul. 24, 2013.

"Seen at 11: Retailers Ready to Force Consumers to Pay 'Swipe Fee' for Using Plastic," NewYork.cbslocal.com, Jul. 27, 2012.

Meece, Mickey, "Be Aware: Credit Card Purchases May Soon Carry a Surcharge," Forbes.com, Jul. 13, 2012.

United States District Court for the Eastern District of New York, Proposed "Class Settlement Agreement," Document 1588-1, Case No. 05-MD-01720-JG-JO (In Re Payment Card Interchange Fee and Merchant Discount Antitrust Litigation), Jul. 13, 2012, Brooklyn, New York.

"Credit Card Processing Calculator" (http://www.merchantcouncil.org/merchant-account/review-compare/credit-card-calculator.php), Merchantcouncil.org, Domains by Proxy, LLC (registrant), Scottsdale, Arizona, Aug. 1, 2012.

"Interchange Profit Calculator" (http://www.greensheet.com/legacy/Interchange_Profit_Calculator.xls), The Green Sheet Inc., Santa Rosa, California, Aug. 1, 2012.

Djurdjevic, Nebo, "Commentary: Mobile payments and low value transactions" (http://www.mobilepaymentstoday.com/article/193382/Commentary-Mobile-payments-and-low-value-transactions), Mobilepaymentstoday.com, Networld Media Group (registrant), Louisville, Kentucky, Apr. 20, 2012.

Papadimitriou, Odysseas, "No Credit Cards for Purchases Under $10" (http://www.cardhub.com/edu/10-dollar-credit-card-payments/), Cardhub.com, Evolution Finance, Inc. (registrant), Arlington, Virginia, Sep. 2, 2011.

"Card security code" (http://en.wikipedia.org/wiki/Card Code Verification), Wikipedia.org, Wikimedia Foundation, Inc. (registrant), San Francisco, California, Sep. 27, 2012.

* cited by examiner

POS Attributes $X_{1...J}$

| Location | Time | Date | Amount | Number of Items | State/Province | Address | Checkout No. | Credit Card Type | MCC | ... | J |
|---|---|---|---|---|---|---|---|---|---|---|---|
| 704 | 706 | 708 | 710 | 712 | 714 | 716 | 718 | 720 | 722 | | |

701

Synoptic Attributes $Z_{1...L}$

| Transaction Volume | Total Sales | Fiscal Period | Credit Card Payment Ratio | Transaction Frequency | Total Transactions-Credit Card Type | Average Transaction Cost | Credit Risk | ... | L |
|---|---|---|---|---|---|---|---|---|---|
| 721 | 723 | 725 | 727 | 729 | 733 | 735 | 737 | | |

703

1000

| Brand (1003) | Surcharge (1005) | Exceptions (1007) |
|---|---|---|
| Bank 1 | .01% | Affinity A |
| Network 1 | .03% | Rewards B |
| Network 2 | $1.00 | • • • |
| Bank 2 | .01% + 50¢ added to purchases under $10 | Transaction Network T |

VOLUME BASED TRANSACTION COST RECOVERY

FIELD OF TECHNOLOGY

Aspects of the disclosure relate to providing apparatus and methods for determining a transaction cost in connection with a transaction between two or more transaction participants.

BACKGROUND

In a transaction, a customer (the "customer") may purchase from a merchant ("the merchant") goods or services ("the product") using credit. The credit may be extended to the customer by an issuing bank (the "issuer"). The issuer may authorize the transaction before extending credit to customer. The merchant may present the transaction to an acquiring bank (the "acquirer"). The acquirer pays the merchant for (and thus "acquires") the product. A transaction processing network in communication with the issuer and the acquirer settles the transaction between the issuer and the acquirer. The transaction processing network may collect transaction processing network fees from the issuer and the acquirer in connection with the settlement.

Settling the transaction may include the transaction network receiving a plurality of transactions from the acquirer. Each transaction may be embodied in a transaction record. Each of the plurality of transaction records may comprise an amount authorized by the issuer. In response to receiving the transaction record the transaction network may debit an account of the issuer. The debit may correspond to the amount authorized by the issuer. The transaction network may credit an account of the acquirer. The amount credited to the acquirer may correspond to the amount authorized.

Settlement may include a transfer of funds between two or more transaction participants. The transfer may be a "book transfer," an inter-bank transfer or any suitable transfer between the transaction participants. A settlement network may transfer the funds between transaction participants. Illustrative settlement networks may include the Federal Reserve Wire Network ("Fedwire") and other suitable settlement networks that are well known to those of ordinary skill in the art. The settlement network may be any suitable network linking one or more accounts of transaction participants.

One transaction participant may impose a transaction cost upon another transaction participant for participating in the transaction. The transaction cost may be referred to as "interchange." Interchange may be a fixed fee for the transaction or a percentage of the transaction. Interchange may be a fixed fee and/or a percentage of the transaction.

Interchange flows from the acquirer, through the transaction processing network, to the issuer. For example, the issuer may transfer to the acquirer an amount net interchange. The issuer typically uses interchange to cover costs of acquiring credit card customers, servicing credit card accounts, providing incentives to retain customers, mitigating fraud, covering customer credit risk, group compensation and other expenses.

The acquirer may deduct a transaction cost from the amount that the acquirer pays the merchant in exchange for the product. The transaction cost may cover the acquirer's transaction processing network fee, interchange, and other expenses. The transaction cost may include a profit for the acquirer.

FIG. 1 shows typical credit card transaction settlement flow 100. Flow 100 involves transaction participants such as the merchant, the customer, and transaction service providers that are identified below. At step 1, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization for the transaction to proceed.

At step 2, the merchant provides $100 in product to the customer. The customer pays with a credit card. At step 3, the issuer transmits to the customer a statement showing the purchase price of ($100.00) due. The issuer collects the purchase price amount, along with interest and fees if appropriate, from the customer. At step 4, the issuer routes the purchase price amount of ($100.00) through the transaction processing network to the acquirer. At step 5, the acquirer partially reimburses the merchant for the purchase price amount. In the example shown in FIG. 1, the partial reimbursement is $98.00. The difference between the reimbursement amount ($98.00) and the purchase price amount ($100.00) is a two dollar ($2.00) transaction cost.

At step 6, the acquirer pays a transaction cost ($1.50), via the transaction processing network, to the issuer. At step 7, both the acquirer and the issuer pay a transaction cost ($0.07 for acquirer and $0.05 for the issuer) to the transaction processing network.

TABLE 1

Net positions, by participant, based on settlement flow 100 (shown in FIG. 1).

| Participant | Net ($) |
|---|---|
| Issuer | 1.45 |
| Acquirer | 0.43 |
| Transaction processing network | 0.12 |
| Merchant | −2.00 |
| Customer | 0 |

In settlement 100 (shown in FIG. 1), the transaction cost is based on an exemplary merchant discount rate of 2%. The $1.50 interchange is based on an exemplary interchange rate of 1.5%. The sum of the transaction processing network fees ($0.07 and $0.05) is based on a total exemplary transaction processing network fee rate of 0.12%.

Transaction processing networks and transaction processing network services are offered under trademarks known to those of ordinary skill in the art. Transaction processing networks may set interchange rates. Issuers may set interchange rates. Interchange rates may vary for each transaction processing network. Interchange rates may vary based on merchant type and size, transaction processing method, transaction volume and other factors.

A merchant may impose a surcharge for accepting credit card payments, establish minimum or maximum purchase price amounts or refuse to accept selected credit cards. The surcharge may allow the merchant to recover or offset some or all of the transaction cost charged to the merchant by other transaction participants. The surcharge imposed by the merchant may be determined and/or limited based on a total transaction cost associated with the transaction. The total transaction cost may include interchange, the merchant discount and network fees.

It would be desirable, therefore, to provide apparatus and methods for determining a transaction cost associated with a transaction.

Imposing the surcharge may adversely impact payment options available to the customer. A customer may wish to avoid the added expense of the surcharge. Although alternative payment options, such as cash, may not be subject to the surcharge, the customer may not wish to carry a sufficient amount of cash to pay for daily purchases.

Carrying cash may be undesirable due to a fear that the cash may be lost or stolen. Furthermore, some customer's may not have access to the sufficient amount of cash needed to pay for daily purchases. Some customers may wish to pay for purchases using credit to obtain rewards or other benefits associated with a credit payment. However, credit payments may be subject to the surcharge. Thus, imposition of the surcharge may result in the customer using an unattractive payment method.

It would be desirable, therefore, to provide apparatus and methods for encouraging merchants to provide customers with attractive payment options.

A merchant may desire to recover at least a portion of the transaction cost. The merchant may not be aware of impact or effect of imposing the surcharge on customers. For example the merchant may be unaware that recovering the entire transaction cost may result in a decrease in sales volume conducted. The merchant may be unaware of how to determine the portion of the transaction cost that may be recovered and maintain sales volume above a threshold level. The merchant may wish to determine whether imposing a surcharge will result in a net gain or a net loss.

It would be desirable, therefore, to provide apparatus and methods for determining a surcharge yield.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for determining a transaction cost recovery amount are provided. The transaction cost may be a cost associated with a transaction. The transaction cost may be associated with one or more transaction services. The transaction cost may be associated with processing the transaction. The processing may include one transaction participant providing services to another transaction participant. The transaction cost may be associated with services performed or provided on behalf of the merchant, the issuer, the acquirer, the customer or any suitable transaction participant.

For example, the transaction cost may include the interchange fee. The transaction cost may include the network fee. The transaction cost may include the fee for providing a transaction service. The transaction cost may include the fee imposed by one transaction participant on another transaction participant in connection with the transaction. Illustrative transaction services are listed in Table 2.

TABLE 2

Illustrative transaction services.

| Illustrative Transaction Service |
|---|
| Sale of goods to customer |
| Authorization of customer credit |
| Clearance of customer credit |
| Notice of customer balance |
| Invoice of customer for bank service |
| Invoice of network fee |
| Invoice of interchange fee |
| Matching of acquirer and issuer |
| Acquisition of goods |
| Collection of balance from customer |
| Settlement of merchant account |
| Transfer of funds to acquirer |
| Debit of funds from issuer |

Figure 1:
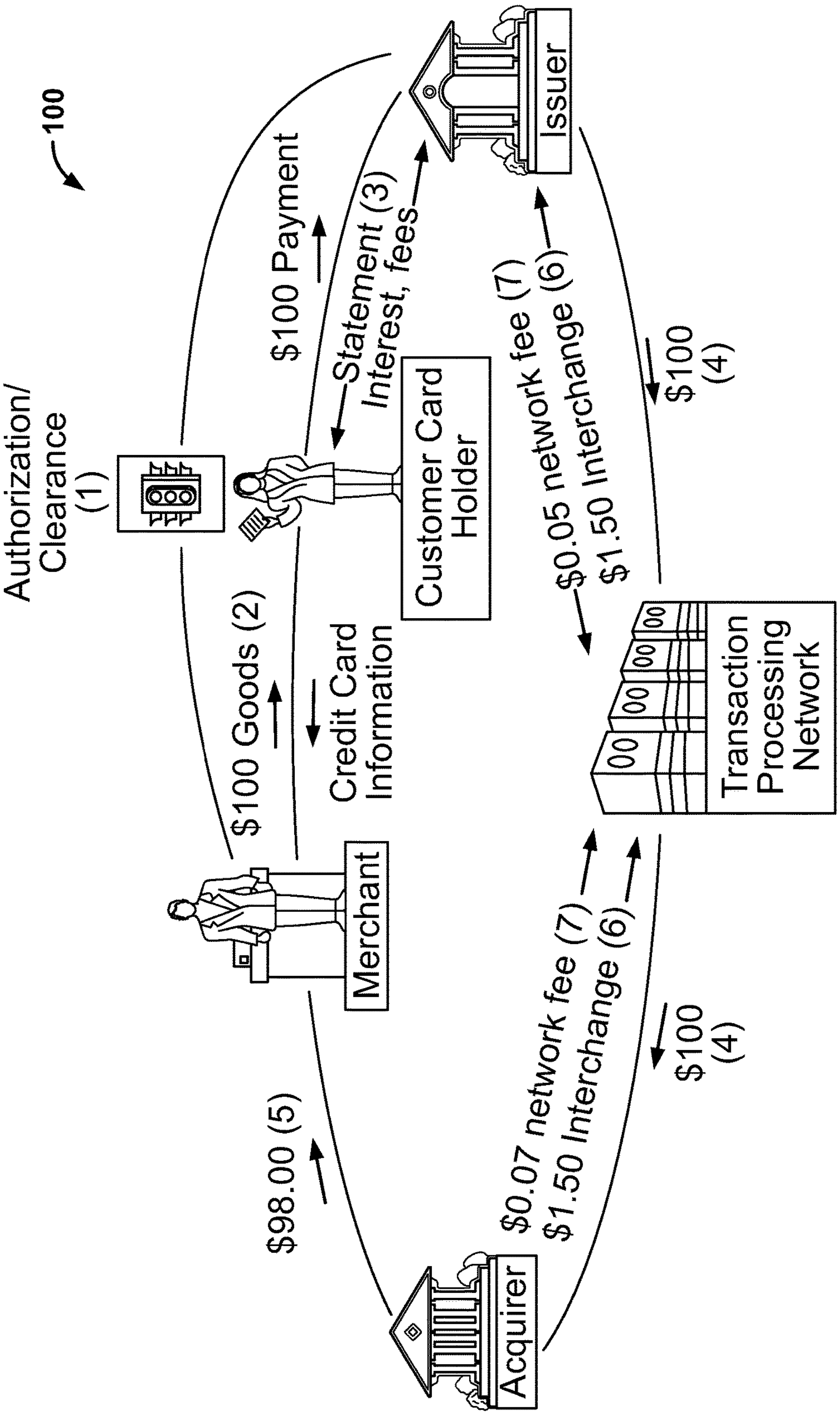
FIG. 1 shows a prior art scenario.

Each transaction service may be performed by a transaction participant. In some circumstances, a participant may perform more than one of the services. Each participant may charge a fee for providing the service. The fee may be charged to one or more of the other participants (as shown in FIG. 1).

Table 3 shows illustrative transaction participant types.

TABLE 3

Illustrative participant types.

| Illustrative Transaction Participant Types |
|---|
| Merchant |
| Customer |
| Authorization service provider |
| Clearance service provider |
| Settlement service provider |
| Issuer |
| Network |
| Acquirer |
| Transaction broker |

More than one participant of a given type may be available to participate in the transaction. Different participants of the same type may have advantages and/or disadvantages relative to the other participants of that type. For example, one issuer may be a member of a lending consortium while another is not a member, one transaction processing network may require payment of a relatively small interchange fee while another network may require payment of a relatively large interchange fee, and the like.

The transaction may involve an acceptance of a payment instrument by a merchant. The transaction may involve a credit, debit, prepaid, automated clearing house, or any suitable payment method involving the transfer of funds from one participant to another.

The transaction may be a transaction in any state of completion. The transaction may be a prospective transaction. The prospective transaction may include the customer presenting the payment instrument to pay for the product. The prospective transaction may include the merchant collecting payment instrument information from the customer.

The transaction may be a pending transaction. For example, a transaction may be pending prior to receiving authorization from the issuer. The transaction may be pending during a time between receiving the authorization and settlement. The transaction may be pending during a time prior to collection, by the issuer, of the purchase amount from the customer.

The transaction may be an executed transaction. Executing the transaction may include a first transaction participant passing the transaction along to a second transaction participant. An executed transaction may include a transaction that has been authorized and settled.

The payment instrument may include a credit card and/or other forms of payment instruments. Such other forms of payment instruments may include: cash, a check, a debit card, an instrument or device that includes a contactless chip, such as an ISO14443-compliant contactless chip, a smart phone, a tablet computer, a transponder or any other suitable electronic purchasing devices. Payment instruments may store data in a magnetic strip, a bar code, a silicon chip, non-volatile computer readable media or any other suitable data storage device or format. The merchant may provide a point-of-sale ("POS") terminal that is configured to receive data from, provide data to, or exchange data with the payment instrument.

The payment instrument may be presented to the merchant by the customer as payment for the product. The transaction cost may be associated with acceptance, by the merchant, of the payment instrument as a form of payment. The transaction cost may be an acceptance cost associated with the payment instrument.

The acceptance cost may include a fee a merchant pays to other transaction participants. The fee may enable the merchant to accept a payment instrument as form of payment for a product. The fee may enable the merchant to receive payments from a transaction network or acquirer associated with the payment instrument.

The transaction may be associated with one or more transaction attributes. The transaction cost may be based on the one or more of the transaction attributes.

A transaction record may be generated based on transaction attributes received and/or available at a time of purchase. Each transaction record may include one or more fields. Each field may include an attribute associated with the transaction. The attribute may be represented by a value. The value may be stored in the field of the transaction record.

Table 4 shows illustrative transaction attributes and associated values.

TABLE 4

Illustrative transaction attributes and associated values.

| Illustrative Transaction Attributes | Illustrative Associated Value |
|---|---|
| Geographic | Longitude/latitude |
| | GPS coordinates |
| | Map coordinates |
| | Elevation |
| | Depth |
| | Distance from a point |
| | Address |
| | Zip code |
| | Area code |
| | County |
| | State |
| | Country |
| | IP address |
| | Signal triangulation |
| Temporal | Seconds |
| | Minutes |
| | Hours |
| | Day |
| | Week |
| | Month |
| | Year |
| | Duration |
| Synoptic | Weather at time of transaction |
| | Stock market performance at time of transaction |
| | Political party in power at time of transaction |
| | Transaction participant credit risk |
| Transaction amount | Dollars |
| | Available credit |
| | Currency |
| | Foreign exchange rate |
| | Low value purchase |
| Number of items purchased | Number |
| | Number of distinct stock keeping units ("SKU") |
| Merchant category code | Numerical identifier |
| | Taxation status |
| | Associated acquirer |
| Surcharge | Offset amount |
| | Surcharge fraction |
| | Maximum surcharge |
| | Minimum surcharge |
| | Percentage of purchase |
| | Fixed amount |
| Payment instrument identifier | Brand |
| | Rewards |
| | Transaction Network |
| | Issuer |
| | Affinity |
| Loyalty program | Rewards/point balance |
| | Membership level |
| | Duration of membership |
| | Frequency of use |
| Access Channel | Point-of-sale |
| | Automated teller machine |
| | Online portal |
| | Self-service kiosk |
| | Mobile device |
| | In person |

The surcharge may be defined by one or more surcharge attributes.

For example, a transaction cost offset amount (hereinafter, "offset amount") may be a surcharge attribute. The offset amount may correspond to an amount charged to a transaction participant. The offset amount may offset a transaction cost charged to the transaction participant. The offset amount may be charged to a customer that pays for a product using a payment instrument. The offset amount may be charged to the customer by the merchant that accepts the payment instrument as a form of payment. The offset amount may correspond to all or a portion of the merchant discount paid by the merchant. The offset amount may correspond to a size of a surcharge imposed by the merchant.

The offset amount may be a percentage of the purchase amount. The offset amount may be a percentage of the transaction cost. The offset amount may be a flat fee. The offset amount may be a combination of a flat fee and a percentage of the purchase amount. The offset amount may be any suitable monetary amount.

The transaction record may include one or more surcharge attributes. The surcharge attribute may be any suitable attribute of the surcharge. A surcharge attribute may include one or more characteristics of a transaction attribute.

For example, a surcharge imposed by the merchant may be associated with surcharge attributes corresponding to an offset amount, a region, a MCC and a payment instrument. Based on the surcharge attributes, a surcharge may be imposed on a purchase made within the region at the location associated with the MCC using the payment instrument.

The surcharge attribute may include a surcharge fraction. The offset amount may be determined based on the surcharge fraction. The offset amount may correspond to a fractional portion of the transaction cost. The offset amount may correspond to a fractional portion of the purchase amount.

The fractional portion may be a product of the surcharge fraction ("SF") and the transaction cost. An exemplary SF may be defined by $0 \leq SF \leq 1$. For example, if the SF is 0.3, the fractional portion may be approximately ⅓ of the transaction cost. The SF may be determined based on a performance metric. The SF may be associated with a transaction attribute.

The SF may be one. When the SF is one, the surcharge may correspond to the entire transaction cost. The SF may be zero. A SF of zero may correspond to no imposition of a surcharge. When the SF is one, the customer may bear the transaction cost. When the SF is zero, the merchant may bear the transaction cost. When the SF is between zero and one, the transaction cost may be shared by the merchant and customer.

The surcharge attribute may include a product type of the payment instrument. The product type may correspond to a "rewards card" or other suitable features of the payment instrument. The merchant may impose a surcharge based on specific attributes associated with the rewards card.

Exemplary surcharge attributes are listed below in Table 5.

TABLE 5

Illustrative Surcharge Attributes.

| Illustrative Surcharge Attributes |
|---|
| Surcharge fraction |
| Total recovery amount |
| Fixed fee amount |
| Payment instrument |
| Payment instrument product type |
| Merchant category code |
| Product stock keeping unit ("SKU") |
| Transaction network |
| Issuer |
| Surcharge imposition start time |
| Surcharge imposition end time |
| Transaction location |
| Transaction time |

The transaction attribute may be a synoptic attribute. The synoptic attribute may be derived by grouping individual transaction records that share one or more attributes. For example, transaction records may be grouped based on a common surcharge. Transaction records may be grouped based on date, merchant category code ("MCC"), number of items purchased or a credit card identifier.

For example, a synoptic attribute may be derived that correlates an offset amount to a purchase amount. The correlation may be expressed as a ratio of the offset amount to the purchase amount. A synoptic attribute may relate the offset amount to number of items sold within a geographic region or on particular date. The synoptic attribute may correspond to an offset amount per item.

Transaction Cost Recovery Analytics

Apparatus may include an article of manufacture comprising a non-transitory computer usable medium having computer readable program code embodied therein. The program code, when executed by a processor, may cause a computer to perform a method for determining a surcharge yield. The surcharge yield may be associated with a surcharge behavior.

The surcharge yield may correspond to a benefit associated with the surcharge behavior. The surcharge yield may correspond to a cost associated with the surcharge behavior. The surcharge yield may correspond to a ratio of the benefit associated with the surcharge behavior to the cost associated with the surcharge behavior. For example, the benefit may correspond to revenue generated by the surcharge behavior. The cost may correspond to lost sales or damage to goodwill correlated with the surcharge behavior. The surcharge yield may indicate whether imposing a predetermined surcharge obtains a profit for, or causes a loss to, a transaction participant. The transaction participant may be a merchant.

The surcharge behavior may be exhibited by a transaction participant. Monitoring the surcharge behavior may include tracking one or more surcharge attributes associated with a surcharge. For example, monitoring the surcharge behavior may include monitoring the surcharge fraction applied by a merchant to one or more credit card transactions.

The surcharge behavior may correspond to a surcharge schedule. The surcharge schedule may be implemented by a transaction participant. For example, a merchant may impose the surcharge schedule on customers that shop at one or more merchant locations. The one or more merchant locations may be "brick and mortar" locations, online locations, mobile locations or any suitable location.

For example, a merchant deploy sales agents at a location. The location may be a trade show, an entertainment event political rally or other temporary venues. The merchant may process transactions at the temporary venue using a mobile device. The merchant may offer special or promotional pricing scheme at the temporary venue. The promotional pricing may include no surcharging at the temporary venue.

The surcharge behavior at the temporary venue may be associated with a transaction attribute corresponding to a geographic region. The surcharge behavior at the temporary venue may be associated with a transaction attribute corresponding to a mobile device configured to process transactions at the temporary venue.

The surcharge schedule may include imposing the surcharge at a designated time. The schedule may include defining a price of a product if payment is made by credit card. The schedule may indicate a "turn on" time and a "turn off" time associated with the surcharge. The merchant may "turn on" a surcharge during morning hours, "turn off" the surcharge during afternoon hours and "turn on" the surcharge during evening hours. The merchant's surcharge behavior may correspond to the surcharge schedule.

The surcharge behavior may be monitored during a time period. The computer readable program code may cause the computer to monitor a change in a performance metric. The change in the performance metric may be monitored during the time period.

The performance metric may be any suitable performance metric. Table 6 lists illustrative performance metrics.

TABLE 6

Illustrative performance metrics.

| Illustrative Performance Metrics |
|---|
| Transaction volume (number) |
| Transaction volume ($) |
| Transaction frequency (per item) |
| Transaction frequency (per sale) |
| Total sales |
| Sales per fiscal period |
| Number of credit card purchases |
| Number of non-credit card purchases |
| Number of items purchased |
| Cost/price per item purchased |
| Same store sales |
| Customer characteristics |

The performance metric may be affected by the surcharge behavior. A change in the performance metric may correspond to an effect of the surcharge behavior on the performance metric. The effect may be an effect on one or more of the transaction participants. The effect may be an effect on one or more suitable parties. The effect may be an effect on profitability. The effect on profitability may include a change in transaction volume, revenue, gross/net profit, number of items sold or any suitable indicator of profitability.

For example, the merchant may impose a surcharge on customers that use a branded credit card to pay for a purchase. Following a "roll out" of the surcharge, the merchant may monitor transaction volume during a time period such as a "holiday shopping season." The transaction volume may be the performance metric. A duration of the "holiday shopping season" may be the time period associated with the performance metric. Data collected by the merchant may indicate the effect of the surcharge on the transaction volume during the holiday shopping season.

As a further example, the performance metric may correspond to a sales volume of a product within a location or geographic region. A merchant may monitor the sales volume of the product within the geographic region. A first transaction attribute may correspond to the geographic region. A second transaction attribute may correspond to the product. A third transaction attribute may correspond to the payment instrument used to make the purchase.

The merchant may monitor how often the product is purchased (1) within a particular zip code, and (2) using a particular payment instrument. The merchant may monitor how often a product is purchased (1) from within the zip code (2) using the payment instrument (3) through an online portal of the merchant. The merchant may monitor how often a product is purchased, using the payment instrument, at a retail location of the merchant. Data collected by the merchant may indicate the effect of the surcharge on sales of the product within the location or geographic region.

The effect may correspond to a change in a purchasing behavior of the customer. For example, if a surcharge is imposed on credit card transactions, the customer may avoid using a credit card to pay for a purchase. If the surcharge is imposed at a merchant location associated with a merchant category code ("MCC"), the customer may avoid making a purchase at the merchant location associated with the MCC. The customer may increase use of alternative payment instruments that are not associated with the surcharge or are associated with a lower surcharge.

Illustrative performance metrics and illustrative performance metric effects are shown below in Table 7.

TABLE 7

Illustrative performance metrics and effects.

| Performance Metric | Performance Effect |
|---|---|
| Transaction volume | Rate of change |
| | Daily volume |
| | Volume per item |
| | Volume at specified time |
| | Volume at specified locations |
| | Number of items sold per transaction |
| Revenue | Daily/hourly revenue |
| | Quarterly earnings |
| | Profit per item sold |
| | Profit per transaction |
| | Surcharge revenue |
| | Cash revenue |
| Transaction cost | Change in acquirer fees |
| | Change in network fees |
| | Change in issuer fees |
| | Change in transaction cost per item |
| | Average transaction cost per transaction |
| | Loss of goodwill (i.e., volume of customer complaints) |
| | Change in number of transactions authorized/denied |
| | Change in surcharge implementation costs |
| | Change in checkout time |

The change in the performance metric may be detected by comparing a first performance metric quantity to a second performance metric quantity. The first performance metric quantity and the second performance metric quantity may be associated with the performance metric.

An exemplary performance metric quantity may be a number corresponding to a volume of sales on the first Tuesday of a month or a number corresponding to net profit during the thirty-third week of a year.

The methods may include receiving a plurality of performance metric quantities. Each of the plurality of performance metric quantities may correspond to an effect of one or more surcharge attributes on the performance metric.

The computer may monitor a change in a first performance metric during the time period. The computer may monitor a change in a second performance metric during the time period. The first performance metric may correspond to a benefit associated with the surcharge behavior. The second performance metric may correspond to a cost associated with the surcharge behavior.

The first performance metric may correspond to revenue generated by the surcharge behavior. The second performance metric may correspond to expenses generated by the surcharge behavior. The expenses may include costs associated with informing customers of the surcharge. The expenses may include costs associated with implementing the surcharge.

The first performance metric may correspond to a transaction volume correlated to the surcharge behavior. The second performance metric may correspond to expenses correlated to the surcharge behavior.

The first performance metric may correspond to a number of credit card purchases made at a merchant location during a time period. The second transaction metric may correspond to a total number of purchases made at the merchant location. The surcharge yield may correspond to a ratio of (1) the number of credit card purchases made at the merchant location during a time period to (2) the total number of purchases made at the merchant location during the time period.

The computer may determine a relationship ("REL") between the surcharge behavior, the change in the first performance metric and the change in the second performance metric. The REL may be based on correlating the surcharge behavior, the change in the first performance metric and the change in the second performance metric.

The correlating may be performed using any suitable technique. For example, the change in a performance metric may be linearly, or non-linearly, regressed upon the surcharge behavior, modeled on the surcharge behavior, predicted from the surcharge behavior or estimated from the surcharge behavior. The correlating may be performed utilizing a multivariate statistical model or a neural network. The correlation may include determining a correlation coefficient that indicates a degree of correlation between two sets of data.

The REL may be determined based on correlating the surcharge behavior with a change in one or more performance metrics. The REL may be determined based on correlating the surcharge behavior with a change in revenue. The REL may be determined based on correlating the surcharge behavior with a change in expenses.

For example, the REL may be determined based on correlating the surcharge behavior with an increase in revenue and a decrease in expenses. The REL may be determined based on correlating the surcharge behavior with a decrease in the revenue and an increase in the expenses.

For example, a merchant may impose a surcharge on credit card purchases and may not impose a surcharge on transactions made using alternative forms of payment. The first performance metric may correspond to a volume of surcharged transactions made during a time period or within a geographic region. The second performance metric may correspond to a volume of non-surcharged transactions made during the time period or within the geographic region.

The merchant may monitor a change in the volume of non-surcharged transactions. The merchant may monitor a change in the volume of surcharged transactions. One or more changes in transaction volumes may be correlated with the surcharge behavior of the merchant.

To determine the change in the performance metric, the article may search a database. For example, the database may store transaction records associated with the merchant. Each of the stored transaction records may include one or more transaction attributes. Each transaction record may include an attribute that identifies the transaction as originating from the merchant. Each stored transaction record may include a transaction attribute that corresponds to a payment instrument brand or network.

Each of the stored transaction records may include one or more surcharge attributes. For example, each stored transaction record may include a surcharge fraction imposed by the merchant on the transaction.

The computer may correlate (1) surcharge attributes of the stored transaction records, with (2) transaction attributes of the stored transaction records. Based on correlating the surcharge attributes and the transaction attributes, the article may determine the change in performance metric. For example, the correlation may show that imposing a surcharge above a threshold offset amount is associated with a decrease in transaction volume.

The computer readable program code may cause the computer to determine the surcharge yield based on the REL.

For example, the surcharge behavior may correspond to a merchant imposing a surcharge associated with an offset amount of $1.50 if credit card brand "B" is used to purchase an item valued between $20 and $100. After "rolling out" the surcharge, the merchant may monitor revenue generated by collection of the offset amount. A change in revenue generated by collection of the offset amount may correspond to the change in the first performance metric.

After "rolling out" the surcharge, the merchant may monitor a transaction volume associated with customer purchases. The transaction volume may include purchases made using an alternative payment method. The alternative payment methods may include a debit card, cash or check. Purchases made using the alternative payment method may not be subject to a surcharge. A change in the transaction volume may correspond to the change in the second performance metric.

The REL may correlate the surcharge behavior, the change in transaction volume and the change in revenue. The REL may indicate that the surcharge behavior is correlated with an increase in revenue. The increase in revenue may result from collection of the offset amount. However, the surcharge behavior may also be correlated with a decrease in transaction volume.

Upon being informed of the surcharge, customers may elect to shop at a merchant that does not impose any surcharge. Even customers that would otherwise pay using alternative payment methods may be unwilling to shop at a merchant that imposes a surcharge on credit card payments. Customers that pay with cash may desire to have the option of purchasing, surcharge free, using a credit card. The decrease in transaction volume may correspond to a reduction in revenue of the merchant.

The surcharge yield may correspond to a net effect of the surcharge behavior. The surcharge yield may indicate whether the surcharge behavior is associated with a net gain in revenue or a net loss in revenue. In the above example, if the revenue generated by collection of the offset amount is greater than a value of the lost transaction volume, the surcharge yield may correspond to a net gain. If a value of the lost transaction volume is greater than the revenue generated by collection of the offset amount, the surcharge yield may correspond to a net loss.

As a further example, the computer may determine that, for a surcharge fraction below a threshold value, the merchant recovers at least a portion of the merchant discount charged for processing a transaction record. The computer may further determine that for a range of purchase values, any revenue reduction attributable to a decrease in transaction volume is counterbalanced by additional revenue generated by recovering at least a portion of the transaction cost. Based on the REL, the surcharge yield may correspond to a net gain for the merchant.

The REL may indicate that increasing the surcharge above a threshold is correlated to a reduction in revenue of a transaction participant. For example, based on the REL, the computer may determine that an offset amount above a threshold value is correlated with a decrease in same store sales. The computer may also determine, based on the REL, that the decrease in same store sales is correlated to a greater detrimental effect on revenue than the additional revenue generated by collection of the offset amount. The REL may indicate that if the offset amount is set at a value above the threshold, the surcharge yield will correspond to a net loss.

The net loss may result from customers eschewing a merchant that imposes a surcharge.

The REL may indicate that decreasing the surcharge fraction below a threshold is correlated with an increase in revenue. The computer may identify the threshold. The computer may identify, based on the REL, one or more surcharge fraction thresholds.

The surcharge yield may include a surcharge recommendation. The surcharge recommendation may suggest a surcharge fraction that, based on the REL, corresponds to an increase in the revenue of the merchant.

The computer readable program code may cause the computer to adjust a future surcharge behavior based on the surcharge yield.

For example, the surcharge yield may correspond to a ratio of revenue generated by the surcharge behavior and expenses and/or costs generated by the surcharge behavior. If the yield is less than one, the expenses generated by the surcharge behavior may be greater than the revenue generated by the surcharge behavior. If the yield is less than one, the computer may adjust a surcharge attribute. The adjustment may include decreasing an offset amount. REL may indicate that a decrease in the offset amount is correlated to an increase in revenue.

Apparatus and methods may include computer program code, that when executed by a processor, causes a computer to determine a surcharge attribute recommendation ("SAR").

The computer readable program code may cause a computer to receive a transaction record. The transaction record may include a plurality of transaction attributes. The transaction record may include a surcharge attribute.

The computer readable program code may cause the computer to correlate the transaction record to a plurality of stored transaction records. Each of the plurality of stored transaction records may include one or more transaction attributes. Each of the plurality of stored transaction records may include one or more surcharge attributes. The stored transaction records may be stored in a database.

For example, the received transaction record may include a surcharge attribute corresponding to a surcharge fraction of 0.01. The received transaction record may include transaction attributes corresponding to a transaction conducted using payment instrument brand "X" to pay for a purchase at merchant location "Y." The received transaction record may be correlated to the plurality of stored transaction records. The correlating may identify stored transaction records that include attributes corresponding to the surcharge fraction 0.01, payment instrument "X" and merchant location "Y."

The computer readable program code may cause the computer to determine a REL between (1) the transaction attributes and the surcharge attribute of the received transaction record and (2) one or more attributes of the plurality of stored transaction records. Determining the REL may include performing the correlation.

For example, a REL may be determined that indicates that for payment instrument "X" and merchant location "Y" imposing the surcharge fraction of 0.01 will result in a decrease in transaction volume conducted at the merchant location "Y." The decrease in transaction volume may indicate that customer's shopping at merchant location "Y" are "sensitive" to a surcharge fraction of 0.01. If a surcharge fraction of 0.01 is imposed on customer's shopping at merchant location "Y" the customers may abandon the purchase or refuse to continue to shop at merchant location "Y."

Based on the REL, the merchant may elect to waive or reduce the surcharge fraction for the transaction corresponding to the received transaction record. Based on the REL, the merchant may decide that a potential benefit accruing from imposing the surcharge is counterbalanced by a potential detriment accruing from imposing the surcharge.

For example, the REL may indicate that imposing the surcharge between the hours of 3 pm and 4 pm at a particular merchant location is associated with an increase in daily revenue. The REL may be based on correlating stored transaction records that include transaction attributes corresponding to the merchant location, the time and the surcharge.

Based on the REL, when a transaction record is received, a decision may be made whether to apply or waive the surcharge. In the example above, if the transaction record is received between the hours of 3 pm and 4 pm the customer will be asked to pay the surcharge.

As a further example, the REL may show that for a transaction conducted at a location within a geographic region, imposing the surcharge may be associated with an increase in revenue. The increase in revenue may result from collection of an offset amount. Based on the REL, a transaction participant may impose the surcharge and collect the offset amount on transaction conducted within the geographic region.

Collecting the offset amount may defray transaction costs paid by a transaction participant to process the transaction. For example, a merchant may be charged a merchant discount to accept payment instruments associated with transaction processing network "Z." To defray or offset the transaction cost charged to the merchant, the merchant may impose a surcharge on customers that pay using a payment instrument associated with transaction processing network "Z."

Based on the REL, the merchant may determine a cost associated with imposing the surcharge. Based on the REL, the merchant may determine a benefit associated with imposing the surcharge. Damage to the goodwill may correspond to an increase in customer complaints regarding the surcharge.

The REL may indicate that historically, if the merchant imposes the surcharge, damage to goodwill of the merchant outweighs a benefit of collecting the surcharge.

For example, the REL may show that in the past, when the merchant has imposed the surcharge, a number of items purchased ("NIP") per transaction decreased. The decrease in the NIP per transaction may indicate that customers are not purchasing, from the merchant, all the items they need. The decrease in the number of items per purchase may indicate that customers are purchasing items from alternative sources. Alternative sources may include merchants that do not impose a surcharge.

The decrease in the NIP per transaction may correspond to an overall decrease in revenue of the merchant. A loss resulting from the decrease in the NIP per transaction may be greater than the revenue generated by imposing the surcharge.

Based on the REL, a SAR may be associated with the received transaction record. The SAR may correspond to suggesting a change to any suitable surcharge attribute. For example, the REL may indicate that if the offset amount is kept below a threshold, the merchant recovers: (1) a portion of the transaction cost, and (2) does not discourage customers from patronizing the merchant.

The REL may indicate that if the merchant imposes an offset amount above the threshold, customers may be discouraged from paying using payment instruments subject to the surcharge. However, customers may continue to patronize the merchant in the form of alternative payment methods. The alternative payment methods may include methods that are not subject to the surcharge.

More specifically, the REL may indicate that imposing a surcharge on credit card transactions is correlated with a decrease in a volume of credit card transactions. The REL may also indicate that when the merchant imposes the surcharge on credit card transactions, the decrease in volume of credit card transaction is offset by a corresponding increase in a volume of cash or check transactions.

The SAR may suggest that the merchant impose the surcharge to trigger the increase in cash or check transactions. The cash or check transactions may be associated with lower transaction costs/expenses than the credit card transactions.

As a further example, the SAR may be associated with a merchant category code ("MCC"). The MCC may group merchants that proffer similar or related products. The MCC may represent a supplier of a particular category of goods or services. The REL may indicate that if a received transaction record is associated with a specific MCC then a particular surcharge fraction should be applied to the transaction. The REL may be based on a correlation between stored transactions that include the MCC and a range of surcharge fractions imposed on the stored transaction records.

The REL may indicate that customers that purchase items associated with a particular MCC are more sensitive to a surcharge. Customer's sensitive to the surcharge may be unwilling to patronize a merchant that imposes the surcharge. If a transaction record is received that includes the particular MCC, the recommendation may advise waiving the surcharge. The recommendation may indicate that the REL suggests that a benefit of imposing the surcharge is counterbalanced by the detrimental effects of imposing the surcharge.

Detrimental effects of imposing the surcharge may include loss of customer loyalty, a decrease in transaction volume, a decrease in revenue, a decrease in NIP per transaction or any suitable detrimental effect. The detrimental effect may be identified by correlating the received transaction attributes to transaction attributes associated with a plurality of stored transaction records.

The SAR may be associated with a geographic region. For example, a merchant may operate a network of stores. The merchant may process transactions generated by the network of stores at a central location. At the central location, the merchant may identify a transaction associated with a particular geographic region based on a transaction attribute of the transaction.

When a transaction record is received at the central location, the transaction attributes of the received transaction record may be correlated to a plurality of stored transaction records. The correlation may be formed based on one or more transaction attributes included in the received transaction record. The one or more transaction attributes may include a surcharge attribute. Based on the correlating, a REL may be determined.

When the transaction is received at the central location, the transaction attribute may be associated with a preexisting REL. The pre-existing REL may include one or more values that correspond to one or more transaction attributes included in the received transaction record.

For the transaction attribute included in the received transaction record, the REL may indicate that a surcharge attribute is correlated with a detrimental effect on the merchant. The detrimental effect may correspond to a decrease in revenue, a decrease in transaction volume, a decrease in the NIP per transaction or any suitable detrimental effect on the merchant.

The REL may correspond to a surcharge sensitivity. The surcharge sensitivity may capture a sensitivity of a performance metric to an imposition of the surcharge. The sensitivity may be derived from historical transaction data by correlating a transaction attribute to a performance metric. The transaction attribute may include the surcharge, store location, temporal value or any suitable attribute of the transaction. The sensitivity may be a slope or a suitable suite of constants through which the performance metric is correlated to the surcharge.

Based on the REL, the SAR may be associated with the received transaction record. The SAR may suggest that the merchant adjust the surcharge attribute. The SAR may suggest that the merchant cease imposing a surcharge.

The SAR may be determined based on the REL. For example, the REL may indicate that the received surcharge attribute will likely have a negative impact on revenue of the merchant. The REL may indicate that the surcharge is correlated with a probability that customers will be unwilling to pay the surcharge. The likelihood may be based on a change in a performance metric, such as a decrease in transaction volume.

The SAR may be associated with a product stock keeping unit ("SKU"). For example, the received transaction record may include a transaction attribute corresponding to a SKU of a product purchased. The SKU may be correlated to stored transaction records that includes a transaction attribute corresponding to the SKU.

Based on the correlation, a REL may be determined. The REL may show that if a surcharge fraction is imposed on purchases that include the SKU, net revenue of the merchant increases. Based on the REL, the SAR may recommend that the merchant maintain a surcharge schedule that imposes a surcharge on purchases that include the SKU.

A surcharge attribute may correspond to a notice time. The notice time may correspond to a period of time during which an intent to "turn on" the surcharge is communicated. The intent may be communicated to the customer, a transaction participant or any suitable party.

Based on the REL, the SAR may recommend a change in the notice time. For example, the SAR may recommend extending the notice time. Extending the notice may provide a longer period of time during which an intent of a merchant to impose a surcharge is communicated.

The SAR may include recommending a period of time. For example, the REL may indicate that a particular offset amount is associated with a decrease in net revenue when the offset amount is imposed during morning hours. The REL may indicate that the particular offset amount is associated with an increase in net revenue when the offset amount is imposed during the afternoon hours.

If a received transaction record is associated with a transaction attribute corresponding to morning hours, the SAR may recommend that the surcharge be waived. The SAR may indicate that the offset amount may increase net revenue if imposed on transactions that occur during the afternoon hours.

The period of time may include a start time. The start time may correspond to a time when a surcharge begins to be imposed on transactions. The period of time may include an end time. The end time may correspond to a time after which the surcharge is no longer imposed on transactions.

The SAR may include any suitable recommendation. The SAR may recommend presenting a promotion to a customer. For example, the promotion may indicate that based on a location or venue associated with the transaction, the transaction is surcharge free. The venue may be a temporary venue. The promotion may state that if the customer pays with cash for three consecutive purchases, the fourth purchase may be made using a credit card, and the credit card transaction will be "surcharge free." The promotion may be based on the REL. The REL may indicate that for every three cash purchases, offering a surcharge free credit card transaction may reduce a number of customer complaints relating to imposition of the surcharge.

Apparatus may include program code that causes a computer to monitor a merchant's surcharge behavior. The merchant's surcharge behavior may correspond to a surcharge schedule imposed by the merchant.

The surcharge schedule may impose the surcharge at a designated time. The schedule may include defining a price of a product if payment is made by credit card. The schedule may include a discount or rebate if payment is made using a debit card or check. The debit card or check may be associated with a lower transaction cost than the credit card. By offering the rebate or discount, the merchant may seek to incentivize the customer to use the debit card or check as payment. The merchant may derive the "credit card price" based on adding the surcharge to a profit margin of a product. The rebate or discount may deduct the surcharge from the "credit card price."

The surcharge schedule may include the plurality of start times. The surcharge schedule may include the plurality of end times. Each start time may be associated with one or more of the end times. The surcharge may be "turned on" after one of the start times. Based on the schedule, the surcharge may be "turned off" after one of the end times.

For example, the merchant may derive, based on the REL, that if a surcharge is imposed on transactions associated with a MCC, performance metric quantities will fall below a performance metric threshold. The merchant may "turn off" the surcharge for purchases of products associated with the MCC. The merchant may dynamically turn on or off the surcharge from a central location based on one or more transaction attributes.

The period of time between the start time and the end time may correspond to a surcharge interval. The surcharge interval may be any suitable time period. Illustrative surcharge intervals may have any suitable length, such as one hour, one day, seven days, two weeks, thirty days, one-month, three months, six months, one year, two years, five years or any other suitable length. The surcharge schedule may include a plurality of surcharge intervals.

The program code when executed by a processor on a computer system may cause the computer system to determine an issuer surcharge recommendation ("ISR").

The computer readable program code may cause the computer to monitor a change in an issuer performance metric. The issuer performance metric may correspond to interchange revenue of the issuer. Illustrative issuer performance metrics are show below in Table 8.

TABLE 8

Illustrative issuer performance metrics.

| Illustrative issuer performance metrics |
|---|
| Number of transactions authorized |
| Number of transactions authorized per instrument product type |
| Number of transaction denied |
| Interchange revenue per transaction |
| Interchange revenue per merchant |
| Interchange revenue per payment instrument |
| Daily interchange revenue |

TABLE 8-continued

Illustrative issuer performance metrics.

| Illustrative issuer performance metrics |
|---|
| Number of chargebacks |
| Number of customer inquiries regarding surcharge behavior |
| Number of customer complaints regarding surcharge behavior |

The computer readable program code may cause the computer to determine a correlation between a change in the issuer performance metric and a surcharge behavior of a merchant. The computer readable program code may cause the computer to generate the ISR based on the correlation.

The surcharge behavior of the merchant may include a surcharge schedule imposed by the merchant. The issuer performance metric may correspond to a number of transactions presented to the issuer for authorization. The issuer performance metric may correspond to a number of transactions presented to the issuer for authorization within a period of time.

For example, the computer may monitor the number of authorization requests transmitted to the issuer. The authorization requests may be transmitted by a merchant. The authorization requests may be transmitted by a transaction processing network. Each authorization request may correspond to a line of credit extended by the issuer. Each authorization request may correspond to a customer account held at the issuer. The issuer may review current account balances or past account history prior to authorizing a transaction. The issuer may issuer a denial in response to the authorization request.

The number of authorization requests presented to the issuer may provide an indication of how often customers are utilizing a payment instrument to pay for purchases. The surcharge behavior of the merchant may have an effect on how often customers pay using the payment instrument. If fewer customers utilize a payment instrument, the issuer may collect fewer interchange fees. The decrease in the number of authorization requests transmitted to the issuer may be correlated to the surcharge behavior of the merchant.

Imposing a surcharge on a transaction may discourage customers from paying with a payment instrument. If fewer customers pay for products using a payment instrument, issuer revenue based on interchange fees collected by the issuer may decrease.

For example, the merchant may impose a surcharge on purchases made using a payment instrument associated with the issuer. The merchant may impose the surcharge in attempt to offset transaction costs associated with processing transactions initiated using the payment instrument. By imposing the surcharge, the merchant may attempt to incentivize customers to pay for purchases using an alternative payment method. The alternative payment method may be associated with a lower transaction cost.

The issuer may monitor interchange fees collected. The issuer may detect a change in the amount of interchange fees collected. The issuer may ascertain whether a correlation exists between the change in interchange fees collected and the merchant's surcharge behavior. A correlation may show that the merchant's surcharge behavior is associated with customers refraining from using payment instruments associated with the issuer. Based on the correlation, the issuer may determine that the surcharge behavior of the merchant negatively impacts the amount of interchange fees collected by the issuer. For example, the correlation may show that collection of fewer interchange fees is highly correlated to fewer customers using one or more payment instruments associated with the issuer.

The ISR may be generated based on the correlation. In the aforementioned example the correlation suggests an association between the merchant's surcharge behavior and the decrease in interchange revenue. Based on the correlation, the computer may suggest an adjustment to the merchant's surcharge behavior.

For example, examination of the correlation may show that the merchant's surcharge behavior is highly correlated to a decrease in authorization requests on weekdays between the hours of 11 am and 2 pm. The recommendation may suggest that the merchant refrain from imposing the surcharge between 11 am and 2 pm on weekdays.

Examination of the correlation may show that the merchant's surcharge behavior is loosely correlated to a decrease in authorization requests on weekends, during early morning hours on weekdays and during late afternoon hours on weekdays. Based on the correlation, the ISR may suggest that the merchant increase or maintain the surcharge on purchases during weekends, morning hours on weekdays and during late afternoon hours on weekdays. The ISR may suggest a surcharge schedule that balances the merchants desire to reduce transaction costs and customers sensitivity to an imposed surcharge. The ISR may suggest a surcharge schedule based on any suitable transaction attribute.

Volume Based Transaction Cost Recovery

Apparatus and methods may include an article of manufacture comprising a non-transitory computer usable medium having computer readable program code embodied therein. The program code, when executed by a processor may cause a computer to apply a surcharge to a credit card transaction.

The computer readable program code may cause the computer to monitor a rate of change in a transaction volume. The transaction volume may be associated with a transaction participant. The transaction volume may be associated with a merchant or a specific merchant location. The transaction volume may be associated with a transaction processing network.

The transaction volume may be associated with a transaction attribute. The transaction volume may be associated with a payment instrument brand or payment instrument product. The transaction volume may be associated with a purchase value.

For example, the transaction volume may correspond to a volume of purchases between $50 and $75 made on a Tuesday, using a payment instrument associated with issuer "I."

The transaction volume may be associated with a network of merchant locations. A merchant may process transactions generated by each of the merchant locations at the central location.

When a threshold rate of change is detected, the computer readable program code may cause the computer to transmit a surcharge notice to a transaction participant. The transaction participant may be a merchant. The transaction participant may be an acquirer. The acquirer may detect the threshold rate of change. In response to detection of the threshold rate of change, the acquirer may transmit the surcharge notice.

The surcharge notice may be transmitted to a merchant location. The surcharge notice may be displayed at the merchant location. The surcharge notice may communicate an intent of the merchant to impose a surcharge. The intent may be communicated to the customer, a transaction participant or any suitable party.

The computer may determine a notice time. The notice time may be a period of time during which a transaction participant communicates the surcharge notice. The merchant may wish to communicate the surcharge notice at the notice time associated with the surcharge. The notice time may provide a "buffer" of time before imposing the surcharge. The buffer may reduce a risk that a customer entering a merchant location will be unaware of the imposed surcharge.

The merchant location may be an online portal of the merchant. The notice time may be determined based on one or more performance metrics. A performance metric may correspond to a transaction volume. The notice time may be determined based on a change in a performance metric. The change in the performance metric may correspond to a rate of change in the transaction volume.

The notice time may be determined based on the performance metric. The notice time may be determined based on an effect of the surcharge on the performance metric. The effect of the surcharge may be measured by a change in the performance metric quantity.

Imposing the surcharge without communicating the intent may damage goodwill of a transaction participant. Illustrative transaction participant types are shown above in Table 3.

For example, the performance metric may correspond to how frequently a "regular" customer makes a purchase at a merchant location. Statistically, the "regular" customer may make a purchase at the merchant location once a week.

The merchant may determine that if the intent to impose the surcharge is not provided at least one week prior to the start time, the "regular" customer may be unaware of the surcharge at the start time. Imposing the surcharge without prior communication of the intent to impose the surcharge may result in damage to goodwill of the merchant. Damage to the goodwill may correspond to the effect of the surcharge. Damage to the goodwill may correspond to the "regular" customer curtailing future purchases from the merchant. Damage to the goodwill may correspond to one or more performance metric quantities falling below a performance metric threshold.

As a further example, the surcharge may be imposed on a payment instrument associated with the issuer. An imposition of the surcharge without adequate notice prior to the start time may result in the customer curtailing use of the payment instrument.

The notice time may be determined based on one or more surcharge regulations. The regulations may govern imposition of the surcharge. The regulations may govern the recovery amount. The regulations may include legislative and/or government agency action. The regulations may include an agreement between transaction participants. For example, an agreement between transaction participants may allow imposition of the surcharge only if transaction participants are notified of the intent to impose the surcharge at least thirty days prior the start time.

The notice time may be determined based on the rate of change in the transaction volume. For example, a merchant may wish to impose a surcharge when the transaction volume exceeds a threshold. When the transaction volume exceeds the threshold, the surcharge yield associated with the surcharge may correspond to a net gain.

The notice time may be determined based on the rate of change in the transaction volume. The computer readable program code may cause the computer to determine the notice time based on the detected threshold rate of change and an expected time to reach the threshold transaction volume.

The threshold rate of change may correspond to an increase in transaction volume during a time period. The threshold rate of change may correspond to a decrease in transaction volume during a time period. Illustrative time periods may have any suitable length, such as one hour, one day, seven days, two weeks, thirty days, one-month, three months, six months, one year, two years, five years or any other suitable length.

The rate of change in a transaction volume may include a batch submission rate. A merchant may submit batches of transactions to an acquirer. The rate of change in the transaction volume may correspond to rate at which batches of transactions are submitted to the acquirer. For example, the merchant may submit batches of 10 k transaction once every 24 hours. The transaction volume may correspond to the number of transactions included in each batch submission.

The computer may correlate a rate of change in the transaction volume to a period of time. The period of time may correspond to an expected duration of time for the transaction volume to exceed the threshold transaction volume. Based on the correlation, the computer may determine that, when a threshold rate of change is detected, the duration of time that will elapse until the transaction volume exceeds the threshold corresponds to a notice time. The notice time may be associated with a surcharge that will be imposed when the threshold transaction volume is reached.

The computer readable program code may cause the computer to apply a surcharge after a threshold rate of change is detected and a threshold transaction volume is detected. For example, the transaction volume associated with a transaction participant may fluctuate during daily business hours. A threshold rate of change in the transaction volume may occur multiple times during daily business hours. However, a combination of the threshold rate of change and a threshold transaction volume may only occur once during daily business hours. The participant may wish to impose a surcharge when the threshold rate of change is detected and the threshold transaction volume is detected.

The surcharge notice may also be transmitted when a combination of a threshold rate of change and a threshold transaction volume are detected. The combination of the threshold rate of change and the threshold transaction volume may also only occur when the transaction volume is on a threshold trajectory.

The trajectory may correspond to a slope of a tangent line. The tangent line may be determined by taking a derivative of graphical relationship between transaction volume and time. The trajectory may correspond to pattern of changes in transaction volume. The pattern may be detected by analysis of stored transaction records.

The computer readable program code may cause the computer to adjust the surcharge based on the detected rate of change. For example, a merchant may wish to decrease the surcharge when transaction volume decreases. The merchant may wish to reduce a surcharge fraction from 0.005 to 0.003 when a first threshold rate of change is detected. When a second rate of change is detected, the merchant may wish to decrease the surcharge fraction to 0.002. When a third rate of change and a threshold transaction volume are detected the merchant may wish to decrease the surcharge to 0.001. The surcharge may be decreased in increments. The increments may be based on one or more RELs.

The rate of change may be associated with an access channel. Illustrative access channels are shown above in Table 4. For example, a merchant may implement a first surcharge schedule at locations within a radius of a stadium. The merchant may implement a second surcharge schedule for purchases made through an online portal of the merchant.

The first surcharge schedule may be associated with a first notice time. The first notice time may be triggered when a first rate of change is detected in a transaction volume. The first rate of change may be determined based on historical transaction volumes conducted at the merchant location within the radius of the stadium.

The second surcharge schedule may be associated with a second notice time. The second notice time may be triggered by detecting a second rate of change in a transaction volume. The second rate of change may be determined based on historical transaction volumes conducted through the online portal. When the second rate of change is detected, the merchant may post the surcharge notice on a homepage or other suitable page of the merchant's online portal.

The rate of change may be associated with a temporal value. For example, an acquirer may wish to impose a surcharge on weekends when a threshold transaction volume is exceeded. When the threshold rate of change in a transaction volume is detected, the acquirer may transmit a surcharge notice to a merchant.

The computer readable program code may cause the computer to adjust the surcharge based on a detected rate of change in a transaction volume. The computer may measure an effect of the surcharge on a rate of change in the transaction volume, and readjust the surcharge if the transaction volume falls below a threshold transaction volume.

For example, a merchant may wish to impose a first surcharge as long as the transaction volume or a rate of change in the transaction volume does not fall below a threshold. When the transaction volume falls below the threshold the merchant may wish to adjust the threshold. When the transaction volume falls below the threshold, the surcharge yield associated with the surcharge may correspond to a greater cost than benefit.

The adjustment may correspond to suspending imposition of the surcharge. The adjustment may correspond to an adjustment in a surcharge attribute. For example, the merchant may reduce the offset amount when the transaction volume falls below the threshold.

Apparatus and methods may include a non-transitory computer usable medium having computer readable program code embodied therein when executed by a processor, causes a computer to determine a surcharge adjustment.

The computer readable program code may cause a computer to receive a first plurality of transaction records. Each of the first plurality of transaction records may include a plurality of transaction attributes. Each of the first plurality of transaction records may include a plurality of surcharge attributes. Each of the first plurality of transaction records may include a synoptic attribute and a surcharge attribute.

The computer readable program code may cause the computer to determine a graphical relationship. The graphical relationship may correlate the synoptic attribute and the surcharge attribute associated with the first plurality of transaction records. The graphical relationship may correspond to an effect of the surcharge attribute on the synoptic attribute.

The computer readable program code may cause the computer to determine an inflection point of the graphical relationship. The inflection point may correspond to a point on the graphical relationship. The inflection point may correspond to a point on the graphical relationship that separates a concave-upward portion of the graphical relationship from a concave-downward portion of the graphical relationship. The inflection point may correspond to a point on the graphical relationship that separates a concave-downward portion of the graphical relationship from a concave-upward portion of the graphical relationship.

The computer readable program code may cause the computer to receive a second plurality of transaction records. Each of the second plurality of transaction records may include a plurality of transaction attributes. Each of the second plurality of transaction records may include a synoptic attribute and a surcharge attribute.

The computer readable program code may cause the computer to adjust the surcharge attribute. The surcharge attribute may be adjusted when the computer detects that one of the second plurality of transaction records includes a synoptic attribute and/or a surcharge attribute corresponding to a target point of the graphical relationship. The target point may correspond to a point within a distance of the inflection point. The distance may be any suitable distance.

The target point may correspond to a point at which a tangent line to the graphical relationship has a predetermined slope. The tangent line may correspond to a derivative of the graphical relationship. The slope of the tangent line may correspond to a rate of change of the graphical relationship.

The synoptic attribute may correspond to a transaction volume. The synoptic attribute may correspond to a rate of change in the transaction volume. The synoptic attribute may correspond to any suitable synoptic attribute. Illustrative synoptic attributes are shown above in Table 4. The surcharge attribute may correspond to a geographic location. The surcharge attribute may correspond to a temporal value. The surcharge attribute may be any suitable surcharge attribute. Illustrative surcharge attributes are shown above in Tables 4 and 5.

The surcharge attribute may correspond to an offset amount. The graphical relationship may correlate the offset amount with the transaction volume.

The adjusting of the surcharge attribute may include increasing the offset amount. The adjusting of the surcharge attribute may include decreasing the offset amount.

Apparatus and methods may include an article of manufacture comprising a non-transitory computer usable medium having computer readable program code embodied therein, the code when executed by a processor causes a computer to apply a surcharge to a credit card transaction.

The computer readable program code may cause the computer to monitor a rate of change in a transaction volume. The transaction volume may be associated with a merchant location. The transaction volume may be associated with any suitable transaction attribute. The merchant location may be one of a plurality of merchant locations.

When a first threshold rate of change is detected, the computer readable program code may cause the computer to apply a first surcharge fraction to one or more transactions. When a second threshold rate of change is detected, the computer may apply a second surcharge fraction to one or more transactions.

The surcharge fraction may be a fractional portion of a maximum allowable offset amount. The maximum offset amount may limit the amount that may be recovered from the customer, or other suitable transaction participant. The maximum offset amount may be less than the transaction cost associated with processing a transaction. The maximum offset amount may be set unilaterally by a transaction participant. The maximum offset amount may be set contractually by an agreement between two or more transaction participants. The maximum offset amount may be set by any suitable party such as a government or government agency.

The first rate of change may correspond to a decrease in the transaction volume. The second rate of change corresponds to an increase in the transaction volume.

The first rate of change may correspond to an increase in the transaction volume. The second rate of change may correspond to a decrease in the transaction volume.

For example, a merchant may detect an increase in transactions that include a transaction attribute corresponding to a particular stock keeping unit ("SKU"). The SKU may correspond to a popular, seasonal or rare goods or service. When the increase in the transaction volume is detected, the merchant may impose a first surcharge. When the decrease in the transaction volume is detected the merchant may impose the second surcharge. The decrease in transaction volume may correspond to less demand for the popular, seasonal or rare item. The second surcharge may be less than the first surcharge.

The first or second surcharge may be determined based on a REL between two or more transaction attributes.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
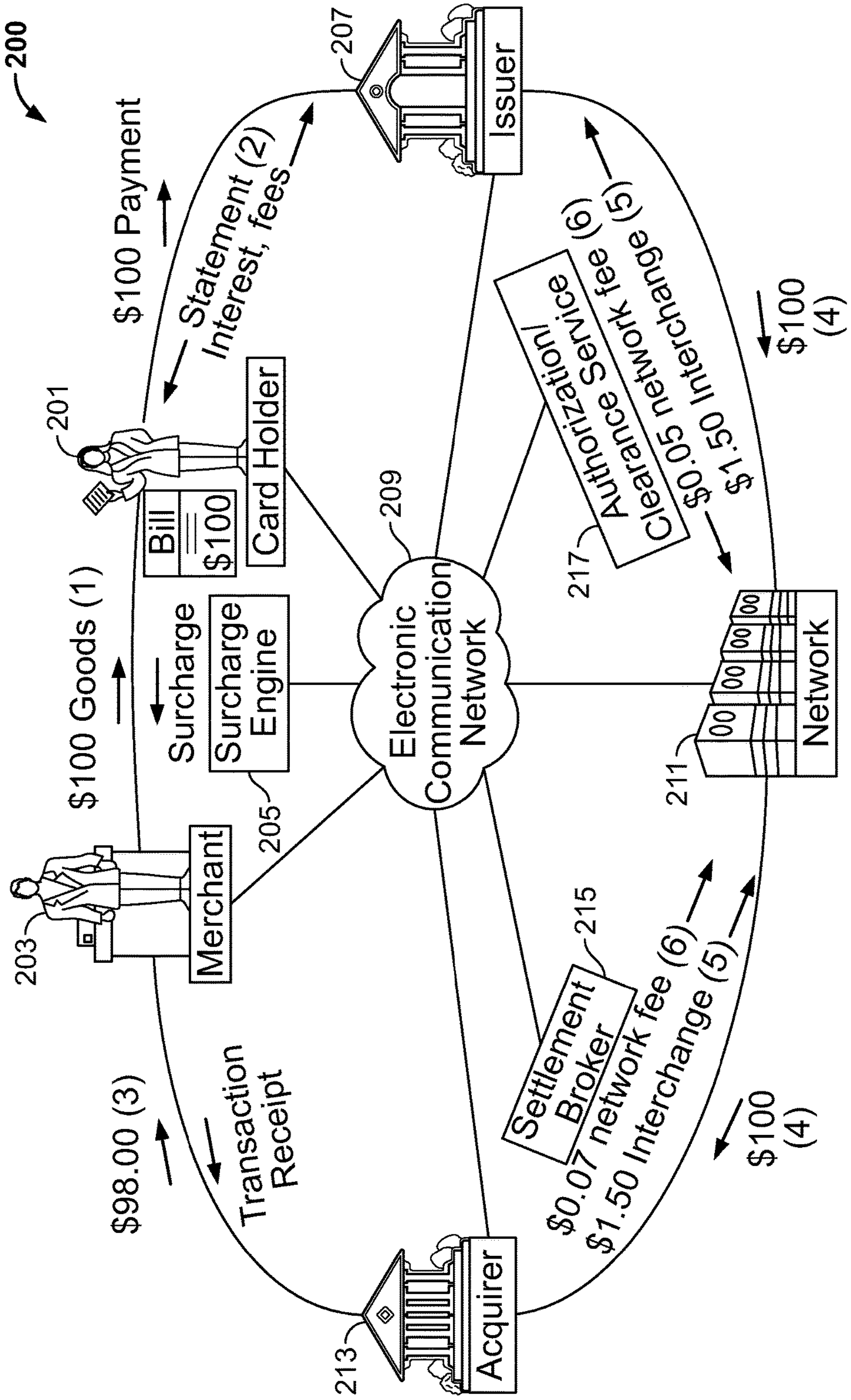
FIG. 2 shows an arrangement in which apparatus and methods in accordance with the principles of the invention may be used.

FIG. 2 shows illustrative credit card transaction settlement flow 200.

At step 1 card holder 201 may offer a payment instrument, such as a credit card, as payment for $100 of goods sold by merchant 203. Card holder 201 may present information associated with the credit card at the merchant's point-of-sale terminal (not shown). The information may be presented via the payment instrument, a loyalty card or any other suitable device or method.

Based on the information presented by card holder 201, surcharge engine 205 may determine an offset amount. The surcharge engine may determine one or more surcharge attributes. The offset amount may be based on the surcharge fraction.

The offset amount may be added to the $100 price charged by merchant 203. The $100 price may include the offset amount. A total amount may be determined. The total amount may include the price, offset amount, sales tax and any other suitable costs associated with the purchase of the goods.

The information presented by card holder 201, may be transmitted via electronic communication network 209 to transaction network 211. The information may include a transaction record.

Transaction network 211 may receive the information presented by card holder 201 via electronic network 209. Based on the received information, transaction network 211 may transmit an authorization, via electronic communication network 209, to merchant 203. Transaction network 211 may communicate with issuer 207. Transaction network 211 may verify that card holder 201 has not exceeded a credit limit associated with the payment instrument. The authorization may include an indication that the transaction network has approved a charge of the total amount to an account associated with the payment instrument. Authorization services may be provided by a third party such as a transaction broker.

Card holder 201 may acknowledge the total amount. The acknowledgement may include an agreement by card holder 201 to place the charge on the account associated with the payment instrument. The acknowledgement may include a commitment by the card holder to pay the total amount to issuer 207.

At step 2, issuer 207 may prepare a statement for card holder 201. The statement may include the total amount owed to issuer 207. The statement may include interest or other fees owed to issuer 207. Issuer 207 may bear an expense of collecting the total amount, interest and fees from card holder 201. A portion of the transaction cost may flow to issuer 207 to fund collection efforts of issuer 207 and offset a risk of default of card holder 201.

At step 3, merchant 203 may present the acknowledgment of card holder 201 and/or the associated authorization by transaction network 211 to acquirer 213. Acquirer 213 may transfer funds to merchant 203 prior to actual collection, by issuer 207, of the total amount from card holder 201. Acquirer 213 may offer funds to merchant 203 prior to settlement between acquirer 213 and issuer 207.

Acquirer 213 may deduct a merchant discount from an amount of funds transferred to merchant 203. The offset amount determined by surcharge engine 205 may offset, at least in part, the merchant discount paid by merchant 203. The offset amount may correspond to transaction costs charged by transaction network 211. The offset amount may include transaction costs charged by acquirer 213 and issuer 207.

In flow 200, the merchant discount is 2% of the $100 price. Without an offset, merchant 203 receives $98 of the $100 price.

At step 4, acquirer 213 settles the transaction with issuer 207. Acquirer 213 may utilize transaction network 211 to settle the transaction. Acquirer 213 may utilize broker 215 to settle the transaction. Broker 215 may offer settlement services at a lower transaction cost than transaction network 211. Broker 215 may offer the lower transaction costs as a result of aggregating transactions from different acquirers. Each of the aggregated transactions may require settlement between issuer 207 and acquirer 213.

Step 4 shows that at least a portion of the merchant discount flows through transaction network 211 from acquirer 213 to issuer 207. Step 4 also shows that transaction network 211 may receive a network fee from acquirer 213. Step 4 also shows that transaction network 211 receives a network fee from issuer 207. Acquirer 213 and issuer 207 may pay transaction network 211 network fees for facilitating settlement of the transaction.

Table 9 shows net positions of the parties to flow 200.

TABLE 9

Net positions.

| Party | Net ($) |
|---|---|
| Issuer | 1.45 |
| Acquirer | 0.43 |
| Network | 0.12 |
| Merchant | 0 |
| Customer | −2.00 |

Table 10 shows benefits of flow 200 to the transaction participants.

TABLE 10

Illustrative benefits of each transaction participant.

| Party | Benefit |
|---|---|
| Merchant | Access to card holder funds and credit |
| | Timely settlement |
| | Protection from customer fraud and credit risk |
| | Increased purchase price amounts |
| | Payment guaranteed |
| Issuer | Reliable payment platform with broad acceptance |
| | Consistent customer experience across merchants |
| | Predictable source of revenue to support card issuance costs |
| Card holder | Access to ready funds and credit |
| | Ability to make purchases virtually anywhere |
| | Protection from fraud |
| | Protection from merchant disputes |
| | Reward for card based purchases |
| | Does not need to carry cash |
| Transaction Broker | Revenue from trading transaction processing bids |
| | Reliable routing platform |
| | Reducing transaction processing overhead |
| | Access to consumers and suppliers of transaction services |

Figure 3A:
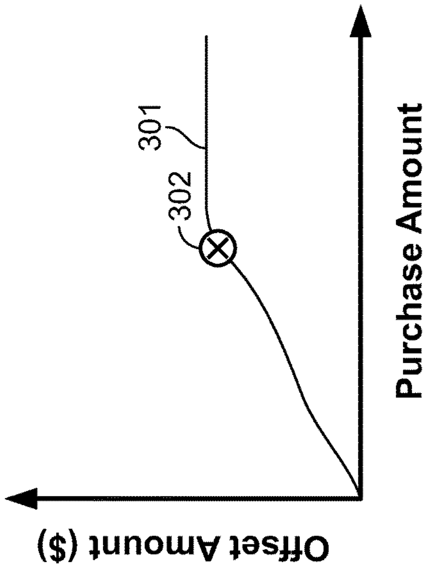
FIGS. 3A-3B show illustrative information in accordance with the principles of the invention.
Figure 3B:
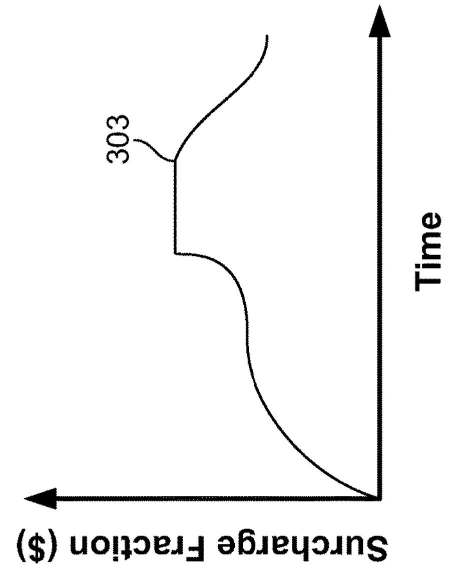

FIGS. 3A and 3B show illustrative surcharge behaviors.

Surcharge behavior 3A shows that an offset amount may be correlated with a purchase amount. The purchase amount may correspond to a purchase of one or more products. Surcharge behavior 3A may be represented by graph 301. Graph 301 shows that, generally, the offset amount increases as the purchase amount increases. Graph 301 also shows that the offset amount may fluctuate with respect to a purchase amount.

For example, graph 301 shows that if the purchase amount increases above target 302, the offset amount does not change as the purchase amount increases. Surcharge behavior 3A may be implemented in a surcharge schedule deployed by a merchant.

Surcharge behavior 3B shows that a surcharge fraction may be correlated with a time. The time may be a transaction attribute. The surcharge fraction may be a surcharge attribute. Surcharge behavior 3B may be represented by graph 303. Graph 303 shows that the surcharge fraction may fluctuate at times. Surcharge behavior 3B may be implemented in a surcharge schedule deployed by a merchant.

Figure 4A:
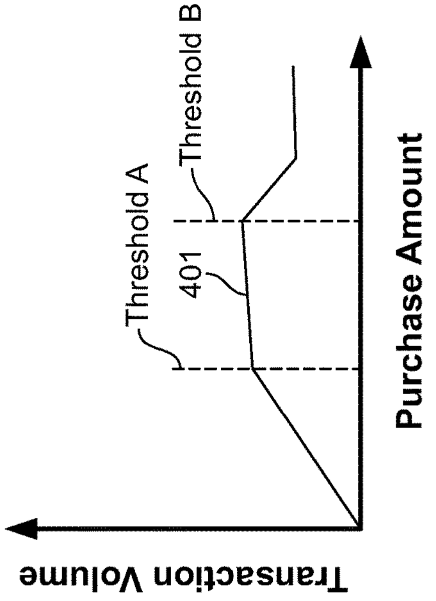
FIGS. 4A-4B show illustrative information in accordance with the principles of the invention.
Figure 4B:
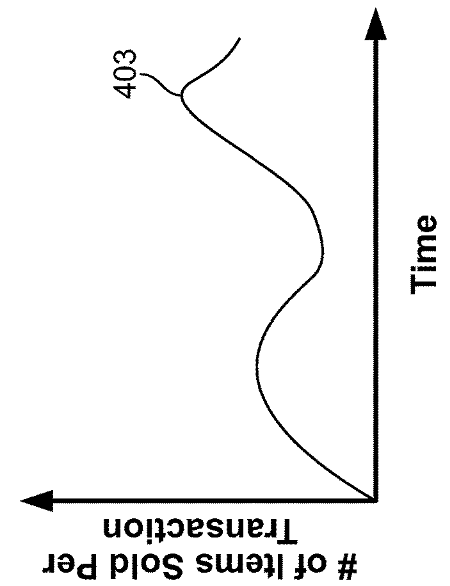

FIGS. 4A and 4B show illustrative transaction behaviors.

FIG. 4A shows that a transaction volume may be correlated with a purchase amount. The purchase amount may be a transaction attribute. Surcharge behavior 4A may be represented by graph 401. Graph 401 shows that transaction volume increases as the purchase amount increases. Graph 401 also shows that after the purchase amount increases above a threshold, the transaction volume remains relatively stable. Graph 401 also shows that when the purchase amount increases above a second threshold, the transaction volume decreases.

FIG. 4B shows that a number of items purchased ("NIP") per transaction may be correlated with a time associated with the purchase. Surcharge behavior 4B may be represented by graph 403.

Figure 5:
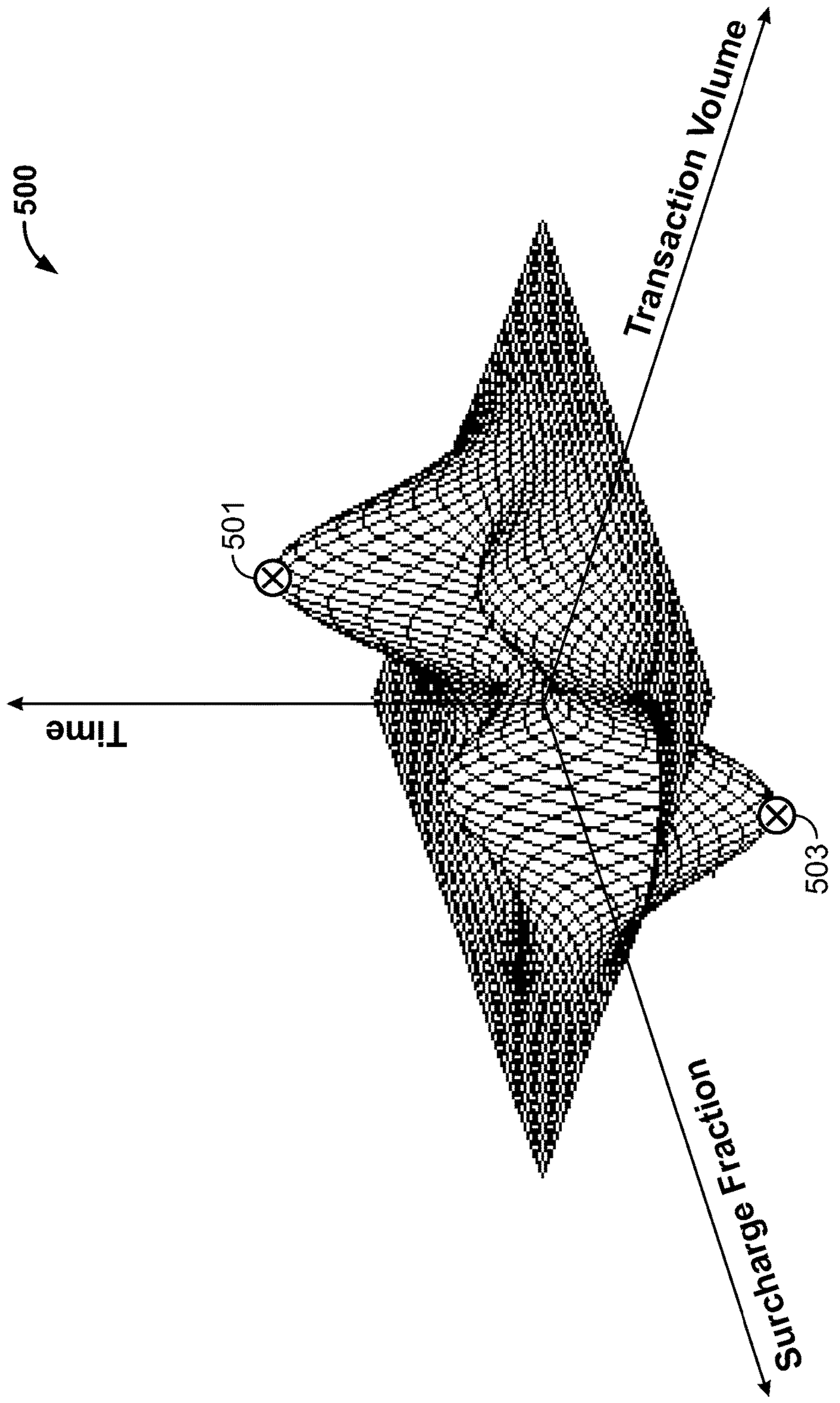
FIG. 5 shows illustrative information in accordance with the principles of the invention.

FIG. 5 shows illustrative REL 500. REL 500 may represent a correlation between a surcharge behavior, such as surcharge behavior 303 (shown in FIG. 3B) and a transaction behavior, such as transaction behavior 403 (shown in FIG. 4B). REL 500 shows a correlation between a time, a surcharge fraction ("SF") and a transaction volume ("TV").

Based on REL 500, a surcharge yield may be determined. For example, point 501 may be associated with three values: $Time_{501}$, $SF_{501}$ and $TV_{501}$. Point 501 may correspond to a point at which the transaction volume is maximized for a given period of time and a given range of is imposed, a transaction participant may expect to experience a transaction volume of $TV_{501}$. Experiencing a transaction volume of $TV_{501}$ may correspond to a surcharge yield. The surcharge yield of $TV_{501}$ may correspond to a net gain for the transaction participant. At point 501, with respect to transaction volume, a "benefit" of applying $SF_{501}$ at $Time_{50l}$ may outweigh a "cost" associated with applying $SF_{501}$.

Point 503 may be associated with three values: $Time_{503}$, $SF_{503}$ and $TV_{503}$. Point 503 may correspond to a point at which the transaction volume is minimized during a period of time and a range of surcharge fractions. At $Time_{503}$, if surcharge fraction $SF_{503}$ is imposed, the merchant may expect to experience a transaction volume of $TV_{H3}$. Experiencing transaction volume $TV_{503}$ may correspond to a surcharge yield. The surcharge yield of $TV_{503}$ may correspond to a net loss for the merchant. At point 501, with respect to transaction volume, a "cost" of applying $SF_{503}$ at $Time_{503}$ may outweigh a "benefit" associated with applying $SF_{503}$.

Figure 6:
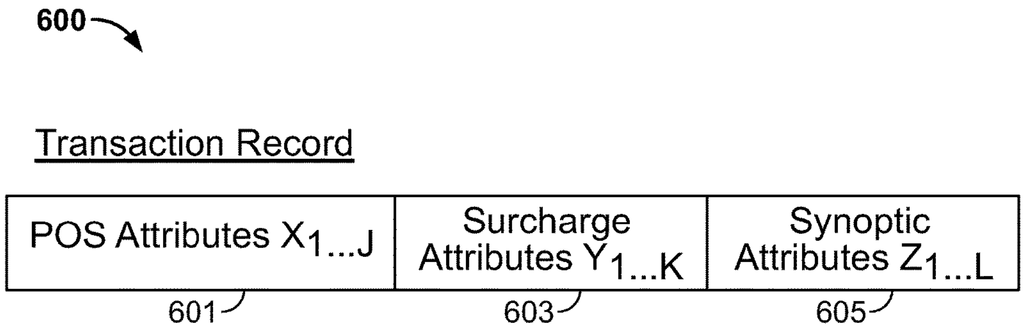
FIG. 6 shows illustrative information in accordance with the principles of the invention.

FIG. 6 shows illustrative transaction record 600. Transaction record 600 may be generated based on transaction information received and/or available at a time of purchase. The transaction record may include point of sale ("POS") attributes 601. POS attributes 601 may include transaction information, customer information and merchant information. Exemplary POS attributes 601 may include a date, a time, a check-out lane indicator or any suitable transaction attribute available at a point-of-sale.

Transaction record 600 may include surcharge attributes 603. Exemplary surcharge attributes 603 may include an offset amount, maximum recovery amount, surcharge fraction, transaction cost or other suitable surcharge information.

Transaction record 600 may include synoptic attributes 605. Synoptic attributes 605 may include attributes derived by a system. Exemplary derived attributes may include a merchant transaction statistic, a market synoptic attribute statistic and an issuer synoptic statistic. The synoptic attributes may be determined based on a pattern detected in a plurality of transaction records. The synoptic attributes 605 may be concatenated to transaction record 600. Synoptic attributes 605 may be concatenated to transaction record 600 after execution of the transaction.

Figure 7:
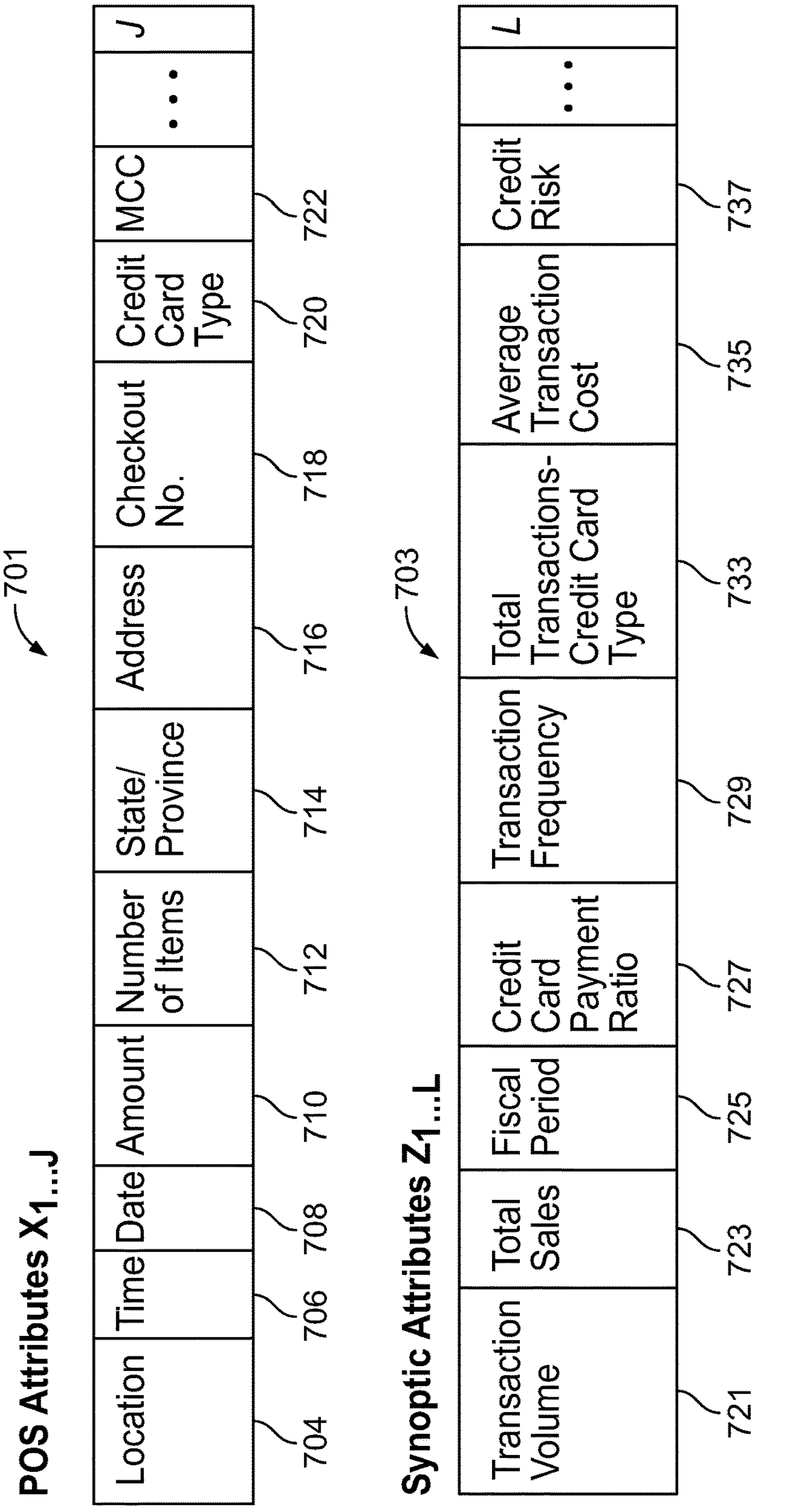
FIG. 7 shows illustrative information in accordance with the principles of the invention.

FIG. 7 shows illustrative POS attributes 701 and illustrative synoptic attributes 703. POS attributes 701 may include location 704. Location 704 may be associated with a POS terminal. Location 704 may be associated with an address. POS attributes 701 may include time 706 and date 708. POS attributes 701 may include amount 710 and number of items 712. Amount 710 may correspond to a price of the product. Number of items 712 may correspond to a number of items purchased by a customer in a transaction.

POS attributes 701 may include state/province 714. State/province 714 may be associated with regulations governing imposition of a surcharge.

POS attributes 701 may include checkout number 718. A merchant may impose a different offset amount at different check-out lines. The merchant may offer no or a reduced surcharge if a self-checkout line is utilized. The self-checkout line may be associated with a checkout number 718.

POS attributes 701 may include credit card type 720. Credit card type 720 may correspond to the payment instrument presented by a customer to pay for a purchase. A surcharge schedule or amount may be associated with credit card type 720.

POS attributes 701 may include merchant category code ("MCC") 722. MCC 722 may group merchants that supply similar products. Some merchants in MCC 722 may impose a surcharge, while others may not. Merchants within MCC 722 may surcharge at different rates or amounts.

FIG. 7 includes synoptic attributes 703. Synoptic attributes 703 may include transaction volume 721, total sales 723 and fiscal period 725. Transaction volume 721 and total sales 723 may be associated with fiscal period 725.

For example, transaction records may be sorted by date 708 and location 704. A first number of transaction records may include the month of September and an address on Main Street. The first number may be appended to each transaction record that includes the date in September and the address on Main Street. The first number may correspond to transaction volume 721. The first number may be a synoptic attribute. A second number of transaction records may include a date in the month of August and the address on Main Street. The second number may be a synoptic attribute.

The first number may be compared to the second number. A result of the comparing may be a synoptic attribute. The first number may be concatenated to transaction records that include the date in September. The second number may be concatenated to transaction records that include the date in August. A result of the comparing may be concatenated to transaction records that include either the date in August or the date in September.

Synoptic attributes 703 may include credit card payment ratio 727. Credit card payment ratio 727 may include a comparison of a number of purchases made using a credit card compared to a number of purchases made using alternative payment methods. The ratio may be computed for a particular merchant, MCC, time/date, location credit card type or other suitable transaction attribute.

Synoptic attributes 703 may include transaction frequency 729, total transactions per credit card type 733 and average transaction cost 735. Average transaction cost 735 may be calculated for a plurality of transaction records.

For example, each transaction record that includes a particular POS attribute, such as a purchase made at location X, may include a variable transaction cost Y. Transaction cost Y may vary based on transaction attributes present in a transaction record. The transaction cost Y may correspond to a surcharge attribute (shown in FIG. 4, item 403). Average transaction cost 735 may correspond to an average transaction cost associated with location X. Average transaction cost 735 may be appended to each transaction record that includes the attribute corresponding to location X.

Synoptic attributes 703 may include credit risk 737. An issuer may associate each authorized transaction with a credit risk. The issuer may append the credit risk to the transaction record.

Figure 8:
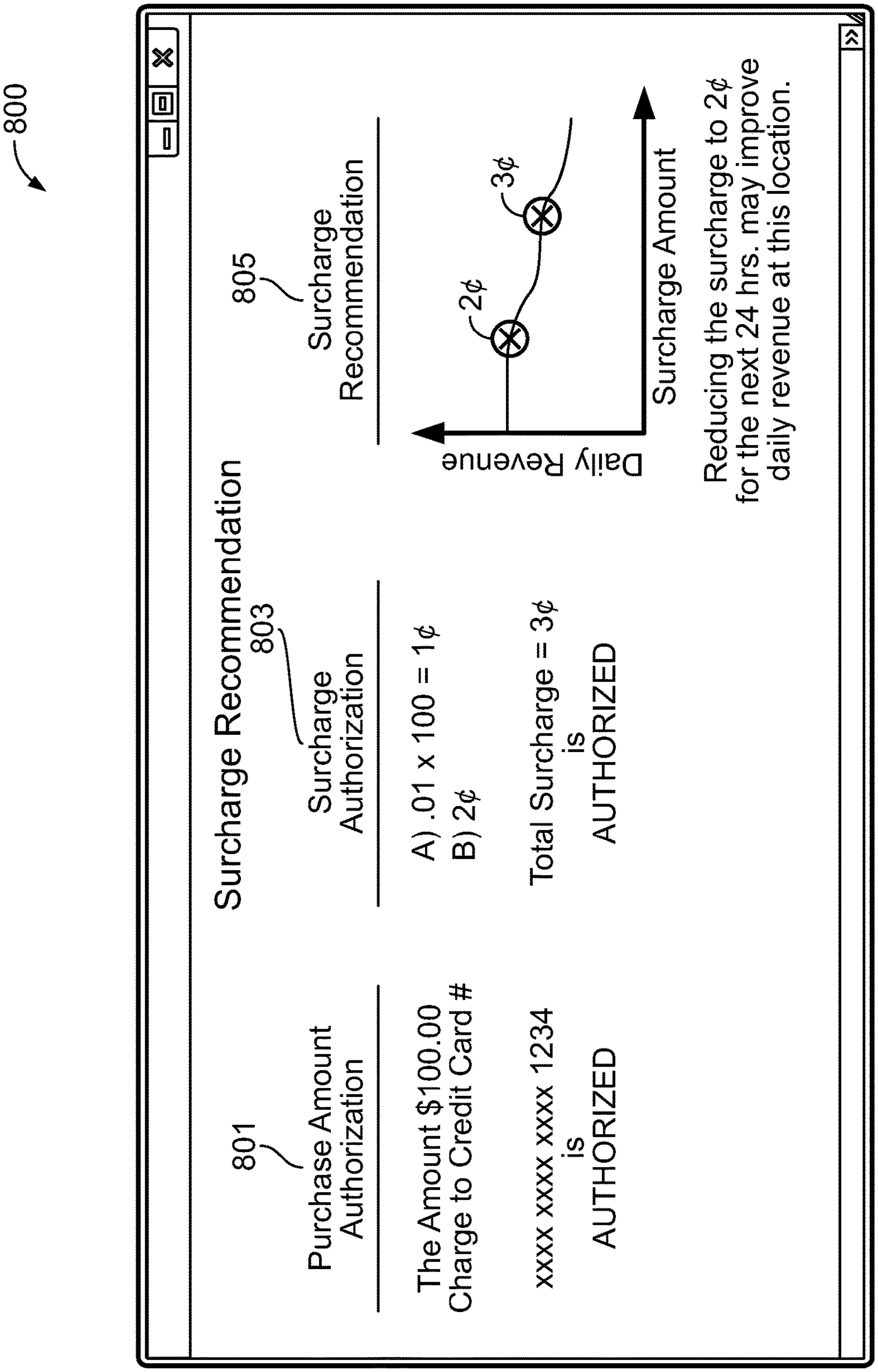
FIG. 8 shows illustrative information in accordance with the principles of the invention.

FIG. 8 shows illustrative information 800. Information 800 may include purchase amount authorization ("PAA") 801. PAA 801 may indicate whether a transaction submitted to an issuer has been authorized by the issuer. PAA 801 may indicate an amount authorized to be charged to an account associated with a payment instrument card number. The payment instrument card number may be a credit card number.

Information 800 may include surcharge amount authorization ("SAA") 803. SAA 803 may indicate whether the issuer has authorized an offset amount to be charged to the account associated with the payment instrument. SAA 803 may display a variable portion of the offset amount. SAA may display a fixed portion of the offset amount. SAA 803 may indicate a total offset amount.

Information 800 may include surcharge recommendation 805. Surcharge recommendation may display a suggested adjustment to the surcharge authorized in SAA 803. Surcharge recommendation 805 may graphically display a REL between a surcharge behavior and a performance metric. Surcharge recommendation 805 may indicate a point on the REL that corresponds to the suggested surcharge. By viewing the graphical display, a transaction participant may be visually shown a benefit or a cost of a recommended surcharge adjustment.

Figures 9, 10:
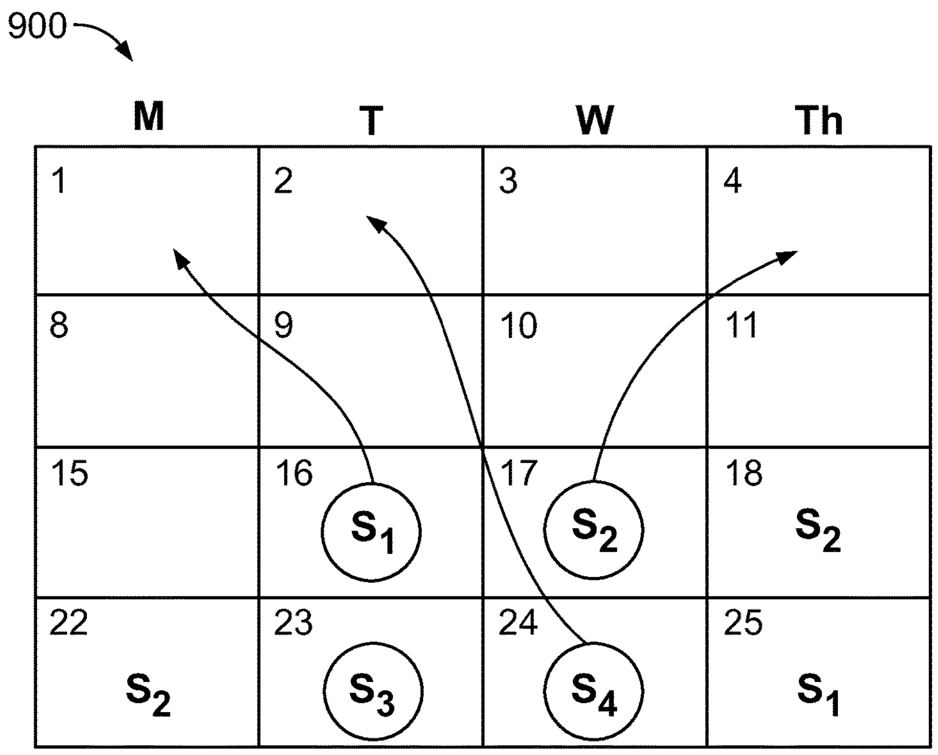
FIG. 9 shows an illustrative information in accordance with the principles of the invention.
FIG. 10 shows illustrative information in accordance with the principles of the invention.

FIG. 9 shows illustrative surcharge schedule 900. Schedule 900 shows surcharges S1-S4. Each surcharge is associated with a weekday.

Schedule 900 shows that surcharge S1 is scheduled to be imposed on Tuesday the $16^{th}$. Schedule 900 also shows that surcharge S1 is associated with a notice time of Monday the $1^{st}$. On Monday the $1^{st}$, one or more surcharge attributes associated with surcharge S1 may be displayed on one or more displays. The notice time associated with S1 may correspond to nine weekdays.

Schedule 900 shows that surcharge S2 is scheduled to be imposed on Wednesday the $17^{th}$ and is associated with a notice time of Thursday the $4^{th}$. On Thursday the $4^{th}$, one or more surcharge attributes associated with surcharge S2 may be displayed on one or more displays. The notice time associated with S2 may correspond to seven weekdays.

Schedule 900 shows that surcharge S3 is scheduled to be imposed on Tuesday the $23^{rd}$ and is not associated with a notice time earlier than the day the surcharge is imposed. On Tuesday the $23^{rd}$, one or more surcharge attributes associated with surcharge S3 may be displayed on one or more displays. S3 may correspond to a reduction of surcharge S2.

Schedule 900 shows that surcharge S4 is scheduled to be imposed on Wednesday the $24^{th}$ and is associated with a notice time of Tuesday the $2^{nd}$. On Tuesday the $2^{nd}$, one or more surcharge attributes associated with surcharge S4 may be displayed on one or more displays. The notice time associated with S4 may correspond to thirteen weekdays.

FIG. 10 shows illustrative surcharge notice 1000. Surcharge notice 1000 may present surcharge information. The surcharge information may include payment instrument brands 1003, surcharge 1005 and surcharge exceptions 1007.

Surcharge notice 1000 includes four exemplary brands 1003. A payment instrument may be associated with one or more of the four brands 1003. A brand may correspond to an issuer of the payment instrument. A brand may correspond to a transaction network affiliated with the payment instrument. Each brand is associated with a surcharge 1005.

For example, Bank 2 is associated with a first surcharge and a second surcharge. The first surcharge includes a surcharge fraction of 1/100. The first surcharge is applied to all purchases. The second surcharge is applied to purchases valued less than $10. The second surcharge includes the surcharge fraction and a fixed amount of 50. The fixed amount may compensate the merchant for a low profit margin associated with purchases valued less than $10.

Display 1000 indicates that each brand 1003 may be associated with a surcharge exception 1007. The surcharge exception 1007 may indicate that a payment instrument may be exempt from the surcharge. For example, display 1000 shows that payment instruments issued by Bank 2 are exempt from the surcharge if the payment instrument is associated with Transaction Network T. Transaction Network T may be the transaction network that authorizes purchases made using one or more payment instruments issued by Bank 2.

Figure 11:
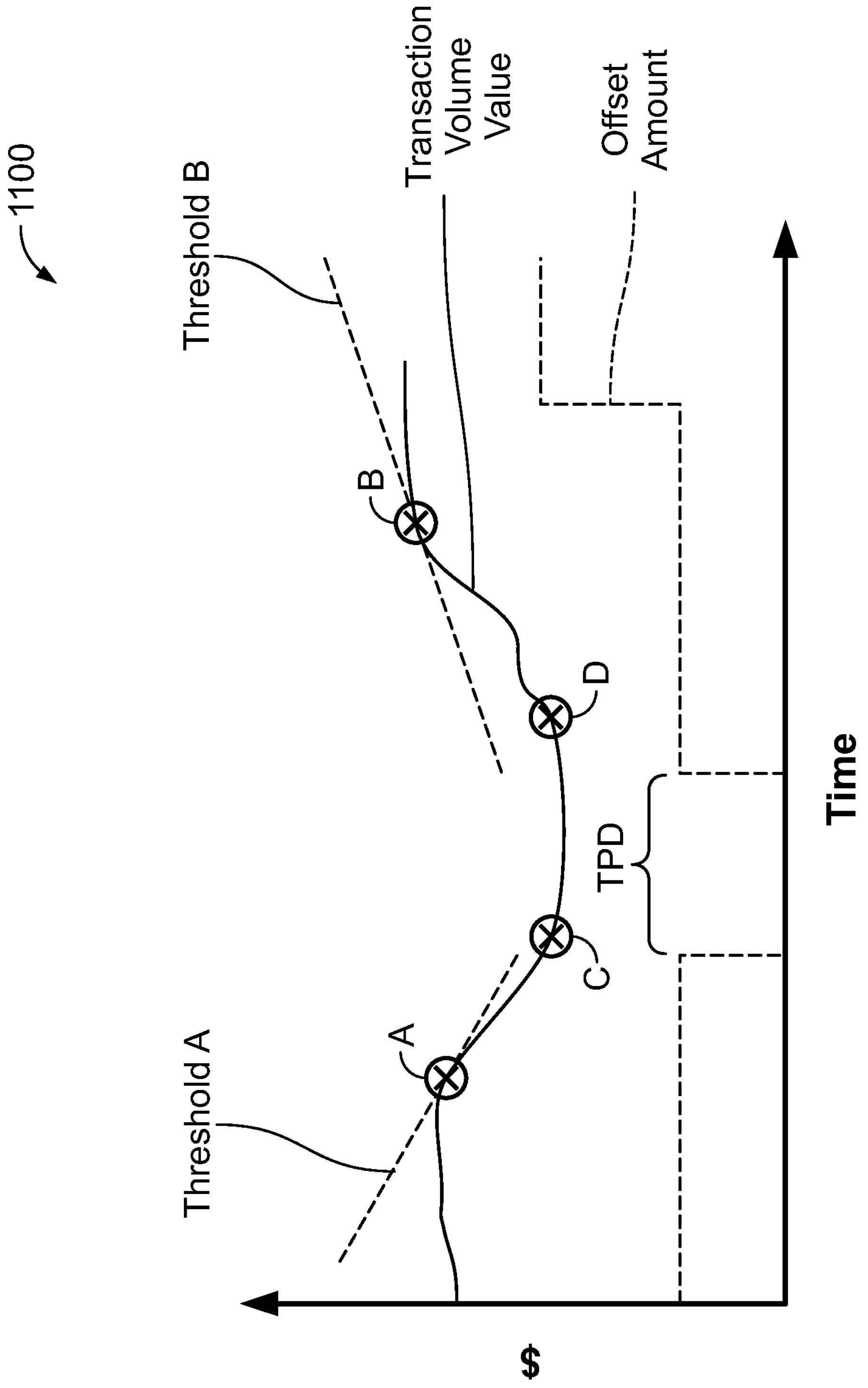
FIG. 11 shows illustrative information in accordance with the principles of the invention.

FIG. 11 shows illustrative information 1100. Information 1100 includes a graphical plot (in solid line) of transaction volume value (in dollars) versus time. The transaction volume value ("TVV") may correspond to a profitability associated with a transaction volume.

Information 1100 also includes a graphical plot (in broken line) of an offset amount (in dollars) versus time. Information 1100 shows the TVV and the offset amount imposed during a time period. The offset amount is imposed on transactions make up the transaction volume. The offset amount may be adjusted based on changes in the TVV.

For example, based on information 1100, threshold A may be identified. Threshold A may correspond to a change in TVV. When threshold A is detected, a merchant may display a first surcharge notice informing customers that the offset amount will be decreased at the time corresponding to point C. Information 1100 shows that at point C, there is a corresponding decrease in the offset amount.

The merchant may maintain the offset amount for a predetermined amount of time, $T_{PD}$. At point D the merchant may detect a change in the TVV. Based on the change detected at point D, the merchant may display a second surcharge notice. The second surcharge notice may inform customers of an intent to increase the offset amount when threshold B is reached. Based on historical data, apparatus and methods described herein may determine an estimated duration of time until threshold B is reached.

After detection of a change in the TVV corresponding to threshold B, the merchant may increase the offset amount. The increase in the offset amount may not occur immediately upon detection of threshold B. The merchant may delay the increase for an amount of time. The delay may correspond to time needed to TVV to "plateau" or reach a maximum value.

A determination of threshold A or B may be based on a REL such as REL 500 (shown in FIG. 5). A determination of the adjustment in the offset amount may be based on a REL such as REL 500.

Figure 12:
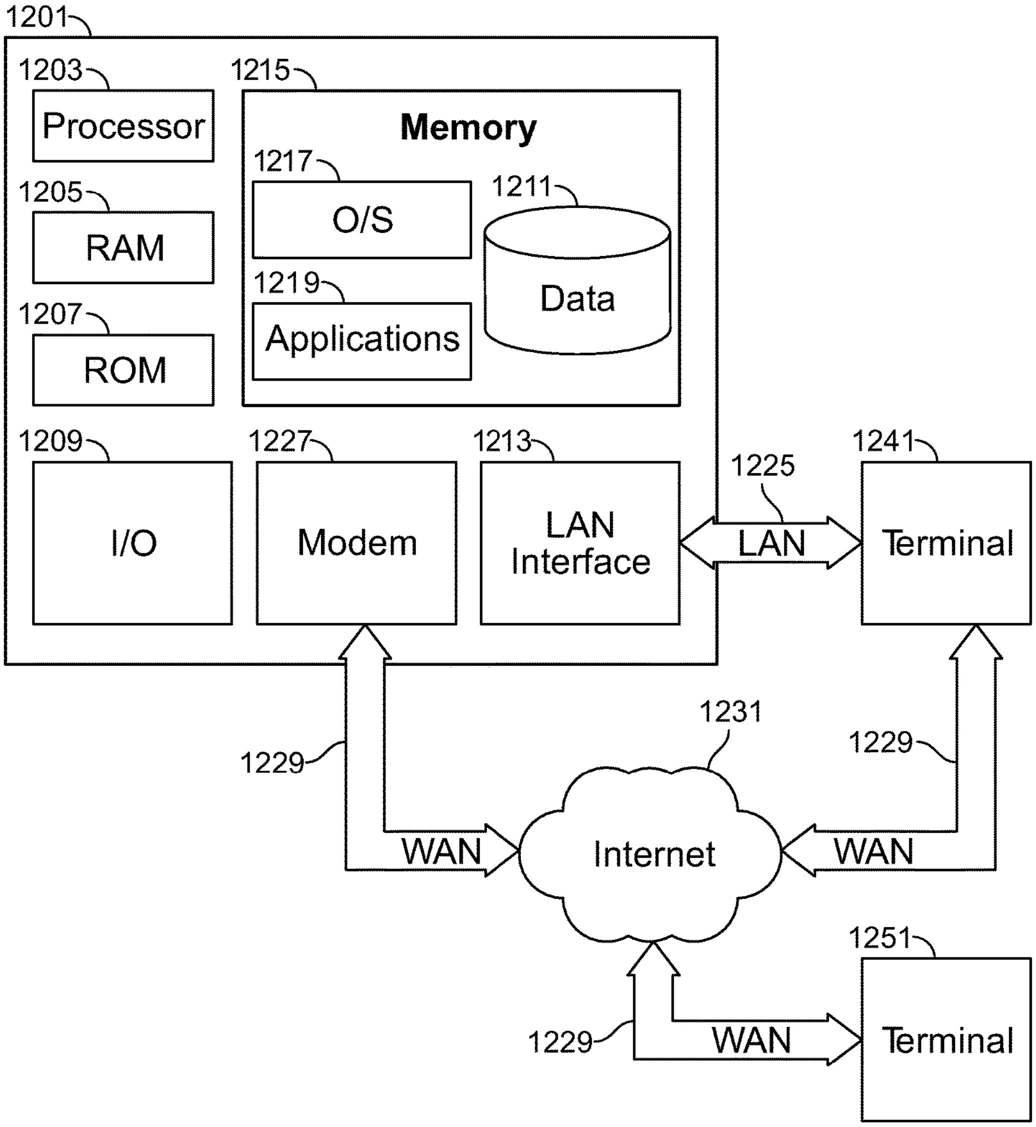
FIG. 12 shows illustrative apparatus in accordance with the principles of the invention.

FIG. 12 is a block diagram that illustrates a generic computing device 1201 (alternatively referred to herein as a "server") that may be used according to an illustrative embodiment of the invention. The computer server 1201 may have a processor 1203 for controlling overall operation of the server and its associated components, including RAM 1205, ROM 1207, input/output module 1209, and memory 1215. Server 1201 may include one or more receiver modules, server modules and processors that may be configured to monitor surcharge behavior, monitor transaction behavior, receive transaction information, route transaction information, receive transaction participant information, receive transaction service provider information, apply transaction routing rules, generate transaction information, compare values and perform any other suitable tasks related to determining a transaction cost and/or a surcharge yield.

Input/output ("I/O") module 1209 may include a microphone, keypad, touch screen, and/or stylus through which a user of device 1201 may provide input, and may also include one or more of a speaker for providing audio output and a video display device for providing textual, audiovisual and/or graphical output. Software may be stored within memory 1215 and/or storage to provide instructions to processor 1203 for enabling server 1201 to perform various functions. For example, memory 1215 may store software used by server 1201, such as an operating system 1217, application programs 1219, and an associated database 1211. Alternatively, some or all of server 1201 computer executable instructions may be embodied in hardware or firmware (not shown). As described in detail below, database 1211 may provide storage for surcharge behavior data, transaction behavior data, transaction cost information, performance metrics quantities, thresholds, merchant information and any other suitable information.

Server 1201 may operate in a networked environment supporting connections to one or more remote computers, such as terminals 1241 and 1251. Terminals 1241 and 1251 may be personal computers or servers that include many or all of the elements described above relative to server 1201. The network connections depicted in FIG. 12 include a local area network (LAN) 1225 and a wide area network (WAN) 1229, but may also include other networks. When used in a LAN networking environment, computer 1201 is connected to LAN 1225 through a network interface or adapter 1213. When used in a WAN networking environment, server 1201 may include a modem 1227 or other means for establishing communications over WAN 1229, such as Internet 1231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 1219, which may be used by server 1201, may include computer executable instructions for invoking user functionality related to communication, such as email, short message service ("SMS"), and voice input and speech recognition applications.

Computing device 1201 and/or terminals 1241 or 1251 may also be mobile terminals including various other components, such as a battery, speaker, and antennas (not shown).

Terminal 1251 and/or terminal 1241 may be portable devices such as a laptop, smart phone, tablet, or any other suitable device for storing, transmitting and/or transporting relevant information.

Any information described above in connection with database 1211, and any other suitable information, may be stored in memory 1215.

One or more of applications 1219 may include one or more algorithms that may be used to receive transaction information, route transaction records, determine surcharge yields, monitor changes in surcharge behavior, monitor changes in transaction behavior, correlate surcharge behavior to transaction behavior, determine graphical representations, identify inflection points and perform any other suitable tasks related to determining a surcharge.

Figure 13:
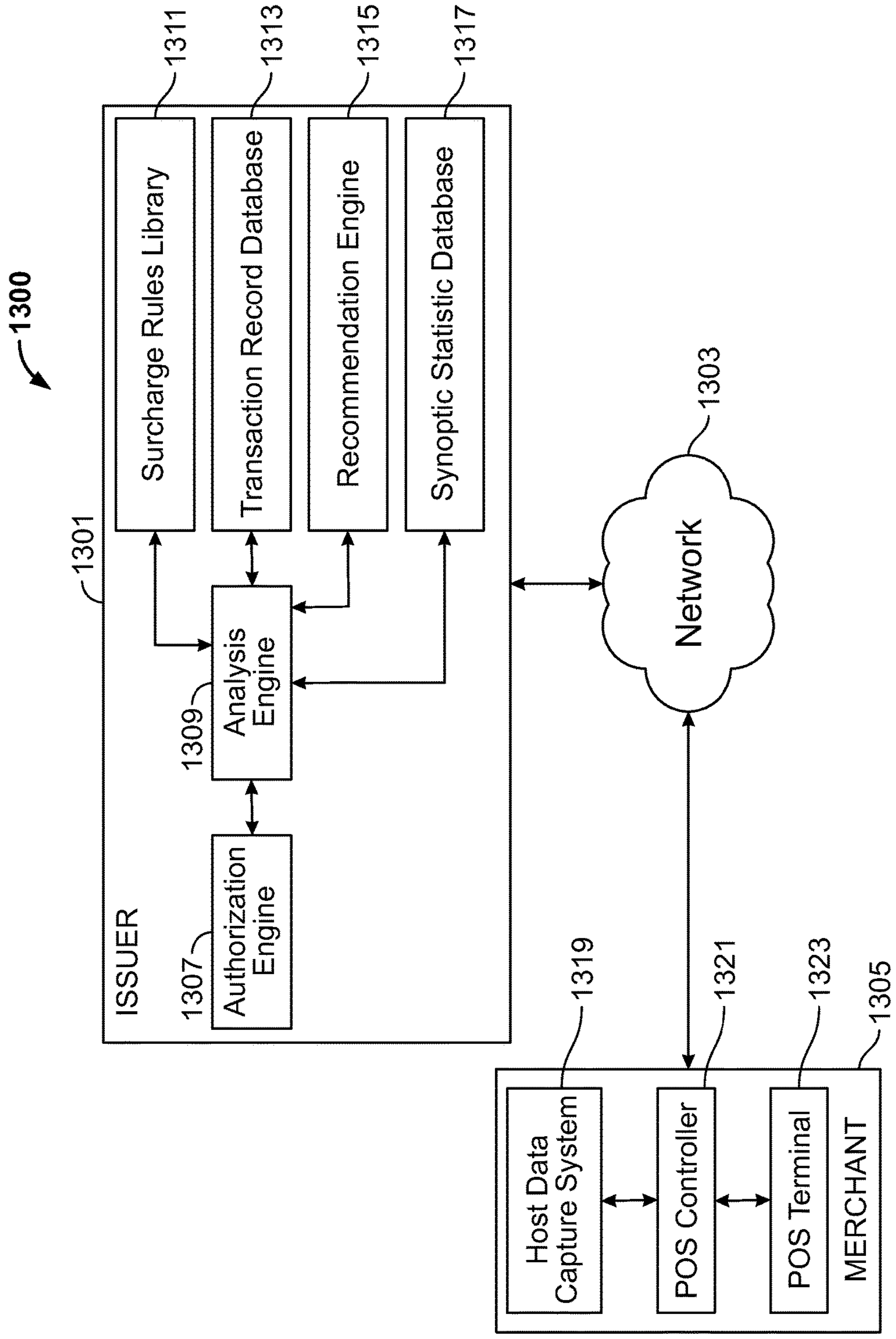
FIG. 13 shows another illustrative apparatus in accordance with the principles of the invention.

FIG. 13 shows illustrative system 1300. System 1300 may include merchant component 1305, network component 1303 and issuer component 1301. In general, a system such as 1300 may include many merchant components such as 1305, many issuer components such as 1301 and many network components such as 1303.

A customer may purchase goods by transferring customer information from a personal data storage device, such as a credit card, to point-of-sale ("POS") terminal 1323. POS terminal 1323 may read the customer information from the card. The card may store data in a magnetic strip, a bar code, a silicon chip or any other suitable data storage device or format. The customer information may include issuer information, account information and any other suitable information.

POS terminal 1323 may transmit transaction behavior information to POS controller 1321. The transaction behavior information may include some or all of the customer information and any other suitable information, such as the transaction amount, information regarding the purchased goods and/or one or more values corresponding to one or more transaction attributes.

POS controller 1321 may act as a server for providing user prompts and display layout information to one or more POS terminals such as POS terminal 1305. POS controller 1321 may receive transaction behavior information from one or more of the POS terminals.

POS controller 1321 may transmit the transaction behavior information to host data capture system 1319. Host data capture system 1319 may store transaction behavior information from POS controller 1321. Host data capture system 1319 may store accounting data, inventory data and other suitable data that may be used to identify a transaction behavior.

The transaction behavior information may include merchant information. The merchant information may include information about the merchant, the merchant's business, the merchant's network membership, the merchant's business behavior and any other suitable information. The transaction behavior information may be stored in any suitable element of merchant component 1305, network component 1303 and issuer component 1301.

Host data capture system 1319 may create a transaction record based on the transaction information. The transaction record may include some or all of the transaction behavior information. The transaction behavior information may include one or more values that correspond to one or more transaction attributes. POS controller 1321 may be configured to determine and/or apply a surcharge. Host data capture system 1319 may be configured to determine and/or apply the surcharge. The surcharge may be determined using any suitable component of system 1300. The surcharge may be based on the transaction behavior information. The surcharge may be displayed at POS terminal 1305.

POS terminal 1305 may have one or more interactive features that the customer may use. The features may provide the customer with information that may help the customer decide whether to execute the transaction. The customer may use the features to obtain more information about the merchant, the transaction, the transaction cost, transaction costs associated with different payment instruments (e.g., credit cards, debit cards, instruments or devices that include a contact chip, such as an ISO14443-compliant contactless chip, or other electronic purchasing devices), surcharge or other suitable information.

Host data capture system 1319 may route the transaction record to network 1303. Network 1303 may include a credit card network "processor," which is known to those of ordinary skill in the art. The illustrative systems shown in FIG. 13 may include one or more other processors that perform tasks that are appropriate for the components thereof.

Network 1303 may route the transaction record to issuer component 1301. Network 1303 may include a network operated by an acquirer such acquirer 213 (shown in FIG. 2). Network 1303 may include a network operated by transaction processing network 211 (shown in FIG. 2). The routing may be governed by the transaction information. For example, the routing may be governed by a bank issuer number ("BIN") that is encoded in the customer's credit card.

Authorization engine 1307 may render a transaction authorization decision based on the transaction record. Authorization engine 1307 may route the transaction record to analysis engine 1309. Authorization engine 1307 may render an authorization decision based on the transaction record. Analysis engine 1309 may render a surcharge authorization decision based on the transaction record.

For example, the transaction record may include a surcharge attribute. The transaction record may be routed to surcharge rules library 1311. Surcharge rules library 1311 may determine whether the surcharge attribute conforms to surcharge imposition rules or regulations governing imposition the surcharge.

Analysis engine 1309 may associate the transaction record with a surcharge recommendation. The surcharge recommendation may include a surcharge yield. The surcharge recommendation may recommend an adjustment to the surcharge.

The received transaction record may be routed to recommendation engine 1315. Recommendation engine 1315 may determine a surcharge recommendation. The surcharge recommendation may be determined based on information stored in transaction record database 1313.

Recommendation engine 1315 may determine a surcharge yield. Transaction record database 1313 may store historical transaction records. The received transaction behavior information may be correlated to information stored in transaction record database 1313. The surcharge yield may be determined based on the correlating.

Recommendation engine 1315 may determine the surcharge yield based on synoptic statistics 1317. Synoptic statistics 1317 may include surcharge sensitivity within a particular market or geographic region. Synoptic statistics 1317 may include issuer synoptic statistics. Exemplary issuer synoptic statistics may include an effect of the surcharge on revenue of an issuer.

Authorization engine 1307 may transmit purchase and surcharge authorization information back to POS terminal 1305 through network 1303, host data capture system 1319 and POS controller 1321. The authorization information may include the authorization decision (e.g., "GRANTED" or "DENIED"). The transaction information may be used by network 1303 to route the authorization information back to the merchant and the POS terminal where the customer is present.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, mobile phones and/or other personal digital assistants ("PDAs"), multiprocessor systems, microprocessor-based systems, set top boxes, tablets, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for determining a transaction cost recovery amount and a surcharge yield have been provided. Persons skilled in the art will appreciate that the present invention can be practiced by other than the described embodiments, which are presented for purposes of illustration rather than of limitation. The present invention is limited only by the claims that follow.

What is claimed is:

1. A dynamic surcharge customization system, the system comprising:

network hardware including a plurality of communication pathways for transmitting and receiving electronic data;

a plurality of transaction participant computer systems comprising:

a plurality of POS devices positioned in distinct geographic locations and configured to:

receive POS data comprising geographic information associated with a first set of transactions initiated by a plurality of credit cards;

upon the receiving of the POS data, transmit the POS data via the network hardware to at least one other transaction participant computer system; and execute the first set of transactions in response to receiving authorization for the first set of transactions via the network hardware; and an issuer computer system remote from the plurality of POS devices and configured to transmit, via the network hardware, the authorization for the first set of transactions; and a centrally-located dynamic surcharge engine including software and hardware, wherein the surcharge engine is in electronic communication with the issuer computer system and the plurality of POS devices via the network hardware and is configured to receive the transmitted POS data, via the network hardware, from the plurality of POS devices, the surcharge engine comprising:

a processor; and a non-transitory computer usable medium having computer readable program code embodied therein, the program code when executed by the processor configures the plurality of POS devices to apply a surcharge to a second set of credit card transactions, the surcharge adjusted to control customer traffic at the distinct geographic locations, the computer readable program code in said article comprising:

computer readable program code for causing the surcharge engine to monitor, in the received POS data, transaction volumes associated with the plurality of POS devices in the distinct geographic locations and rates of change in the transaction volumes associated with the plurality of POS devices;

computer readable program code for causing the surcharge engine to transmit surcharge notices, to at least one of the plurality of POS devices in a target geographic location when a predetermined rate of change threshold is detected by the program code;

computer readable program code for causing the surcharge engine to apply the surcharge to the second set of transactions and thereby control customer traffic at the target geographic location after:

the predetermined rate of change threshold is detected; and a predetermined transaction volume threshold within the target geographic location is detected by the program code; and computer readable program code for causing the surcharge engine to:

adjust an amount of the surcharge based on the POS data, including the monitored rates of change, such that imposing the adjusted surcharge amount on the second set of transactions received by POS terminals within the target geographic location controls customer traffic by:

increasing transaction volume within a predetermined time period; or decreasing transaction volume within the predetermined time period; and transmit to the issuer computer system, via the network apparatus, the adjusted surcharge amount;

wherein, the issuer computer system, in response to receiving the adjusted surcharge amount, transmits authorization for the adjusted surcharge amount to the POS terminals within the target geographic location via the network hardware;

wherein the predetermined rate of change threshold is associated with the target geographic location; and wherein the surcharge engine dynamically adjusts the amount of the surcharge to increase or decrease the transaction volume within the predetermined time period and thereby maintain a target transaction volume at the target geographic location.

2. The surcharge customization system of claim 1 wherein the predetermined rate of change threshold corresponds to an increase in the transaction volumes during a time period.

3. The surcharge customization system of claim 1 wherein the predetermined rate of change threshold corresponds to a decrease in the transaction volumes during a time period.

4. The surcharge customization system of claim 1 further comprising computer readable program code for causing the surcharge engine to adjust the surcharge based on the monitored rates of change.

5. The surcharge customization system of claim 1 further comprising computer readable program code for causing the surcharge engine to determine a notice time based on:

the detected predetermined rate of change threshold; and an expected time to reach the threshold transaction volumes.

6. The surcharge customization system of claim 1 wherein the predetermined rate of change threshold is associated with a temporal value.

7. The surcharge customization system of claim 1 wherein the transaction volumes are associated with a network of merchant locations.

8. The surcharge customization system of claim 1 further comprising computer readable program code for causing the surcharge engine to:

measure an effect of the adjusted surcharge amount on the rates of change; and readjust the surcharge amount if the transaction volumes fall below the transaction volume threshold.

9. The surcharge engine of claim 1, the computer readable program code in the surcharge engine further comprising:

computer readable program code for causing the surcharge engine to receive a first plurality of transaction records, each of the first plurality of transaction records comprising a synoptic attribute and the surcharge;

computer readable program code for causing the surcharge engine to determine a graphical relationship that correlates the synoptic attribute and the surcharge;

computer readable program code for causing the surcharge engine to determine an inflection point of the graphical relationship;

computer readable program code for causing the surcharge engine to receive a second plurality of transaction records each of the second plurality of transaction records comprising the synoptic attribute and the surcharge; and computer readable program code for causing the surcharge engine to adjust the surcharge when at least one of the second plurality of transaction record comprises the synoptic attribute and the surcharge corresponding to a point within a distance of the inflection point.

10. The surcharge engine of claim 9 wherein:

the synoptic attribute corresponds to the transaction volumes; and the graphical relationship correlates the surcharge amount with the transaction volumes.

11. The surcharge engine of claim 9 wherein adjusting the surcharge comprises increasing the surcharge.

12. The surcharge engine of claim 9 wherein adjusting the surcharge comprises decreasing the surcharge.

13. The surcharge engine of claim 9 wherein the graphical relationship corresponds to an effect of the surcharge on the synoptic attribute.

14. The surcharge engine of claim 9 wherein the synoptic attribute corresponds to the rates of change in the transaction volumes.

* * * * *